US010185204B2

(12) United States Patent
Goto et al.

(10) Patent No.: US 10,185,204 B2
(45) Date of Patent: Jan. 22, 2019

(54) MACH-ZEHNDER MODULATOR, METHOD FOR FABRICATING MACH-ZEHNDER MODULATOR

(71) Applicant: SUMITOMO ELECTRIC INDUSTRIES, LTD., Osaka (JP)

(72) Inventors: Hiroaki Goto, Yokohama (JP); Takamitsu Kitamura, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 18 days.

(21) Appl. No.: 15/476,365

(22) Filed: Mar. 31, 2017

(65) Prior Publication Data
US 2017/0285438 A1    Oct. 5, 2017

(30) Foreign Application Priority Data

Apr. 4, 2016   (JP) .................................. 2016-075198

(51) Int. Cl.
    *G02F 1/225*    (2006.01)
    *G02F 1/21*    (2006.01)

(52) U.S. Cl.
    CPC ...... *G02F 1/2257* (2013.01); *G02F 2001/212* (2013.01); *G02F 2201/12* (2013.01)

(58) Field of Classification Search
    CPC ............. G02F 1/2257; G02F 2001/212; G02F 2201/12
See application file for complete search history.

(56) References Cited

U.S. PATENT DOCUMENTS 6,198,855 B1 *  3/2001  Hallemeier ............. G02F 1/035
    385/2
6,331,678 B1 * 12/2001  Wang ................... H05K 1/0271
    174/253
(Continued)

FOREIGN PATENT DOCUMENTS

JP    2013-250527    12/2013

OTHER PUBLICATIONS

Jensen, Henrik, Delamination of Thin Films, Proceedings of the 15th European Conference on Fracture ECF 15, ECF15, available at www.gruppofrattura.it/ocs/index.php/esis/ECF15/paper/view/8800/4859.*

(Continued)

*Primary Examiner* — Peter Radkowski
(74) *Attorney, Agent, or Firm* — Smith, Gambrell & Russell, LLP.

(57) ABSTRACT

A Mach-Zehnder modulator includes: a semiconductor structure having a first waveguide portion, a second waveguide portion, and a third waveguide portion, which are disposed on the first area, the second area, and the third area of a principal surface of substrate, respectively; an embedding resin body having an opening on the first waveguide portion; an ohmic electrode including a first ohmic electrode portion connected to the first waveguide portion through the opening of the embedding resin body, and a second ohmic electrode portion disposed on the embedding resin body in the second area; and a conductor including a first conductive portion extending along the first ohmic electrode portion, and a second conductive portion disposed on the embedding resin body and having a width greater than that of the second ohmic electrode portion, the embedding resin body having a groove extending along an edge of the second ohmic electrode portion.

12 Claims, 18 Drawing Sheets

(56) References Cited

U.S. PATENT DOCUMENTS

| | | | | |
|---|---|---|---|---|
| 7,324,257 B2* | 1/2008 | McBrien | ............... | G02F 1/0356 359/245 |
| 7,343,055 B2* | 3/2008 | McBrien | ............... | G02F 1/0356 359/245 |
| 7,529,433 B2* | 5/2009 | Kissa | ................... | G02F 1/0316 385/14 |
| 7,844,149 B2* | 11/2010 | Kissa | ................... | G02F 1/0316 385/1 |
| 8,774,565 B2* | 7/2014 | Kissa | ................... | G02F 1/2255 385/2 |
| 8,849,071 B2* | 9/2014 | Kissa | ...................... | G02F 1/225 385/3 |
| 8,986,560 B2* | 3/2015 | Kitamura | ................ | G02F 1/025 216/24 |
| 9,329,451 B2* | 5/2016 | Kitamura | ................ | G02F 1/025 |
| 2006/0023288 A1* | 2/2006 | McBrien | ............... | G02F 1/0356 359/245 |
| 2007/0116475 A1* | 5/2007 | McBrien | ............... | G02F 1/0356 398/164 |
| 2011/0158576 A1* | 6/2011 | Kissa | ...................... | G02F 1/225 385/3 |
| 2012/0099812 A1* | 4/2012 | Kissa | ................... | G02F 1/2255 385/2 |
| 2014/0116983 A1* | 5/2014 | Kitamura | ................ | G02F 1/025 216/13 |
| 2015/0023627 A1* | 1/2015 | Kimura | ................ | G02F 1/2257 385/3 |
| 2015/0132877 A1* | 5/2015 | Kitamura | ................ | G02F 1/025 438/31 |

OTHER PUBLICATIONS

Dogru et al., Traveling Wave Electrode for Wide-Bandwidth Substrate-Removed Electro-Optic Modulators, MS5, 2012.*

Tu et al., Silicon optical modulator with shield coplanar waveguide electrodes, Optics Express, V. 22, N. 19, 23724, 2014.*

Yi et al., Electro-optic modulator with exceptional power-size performance enabled by transparent conducting electrodes, Optics Express, V. 18, N. 7, 6783, 2010.*

* cited by examiner

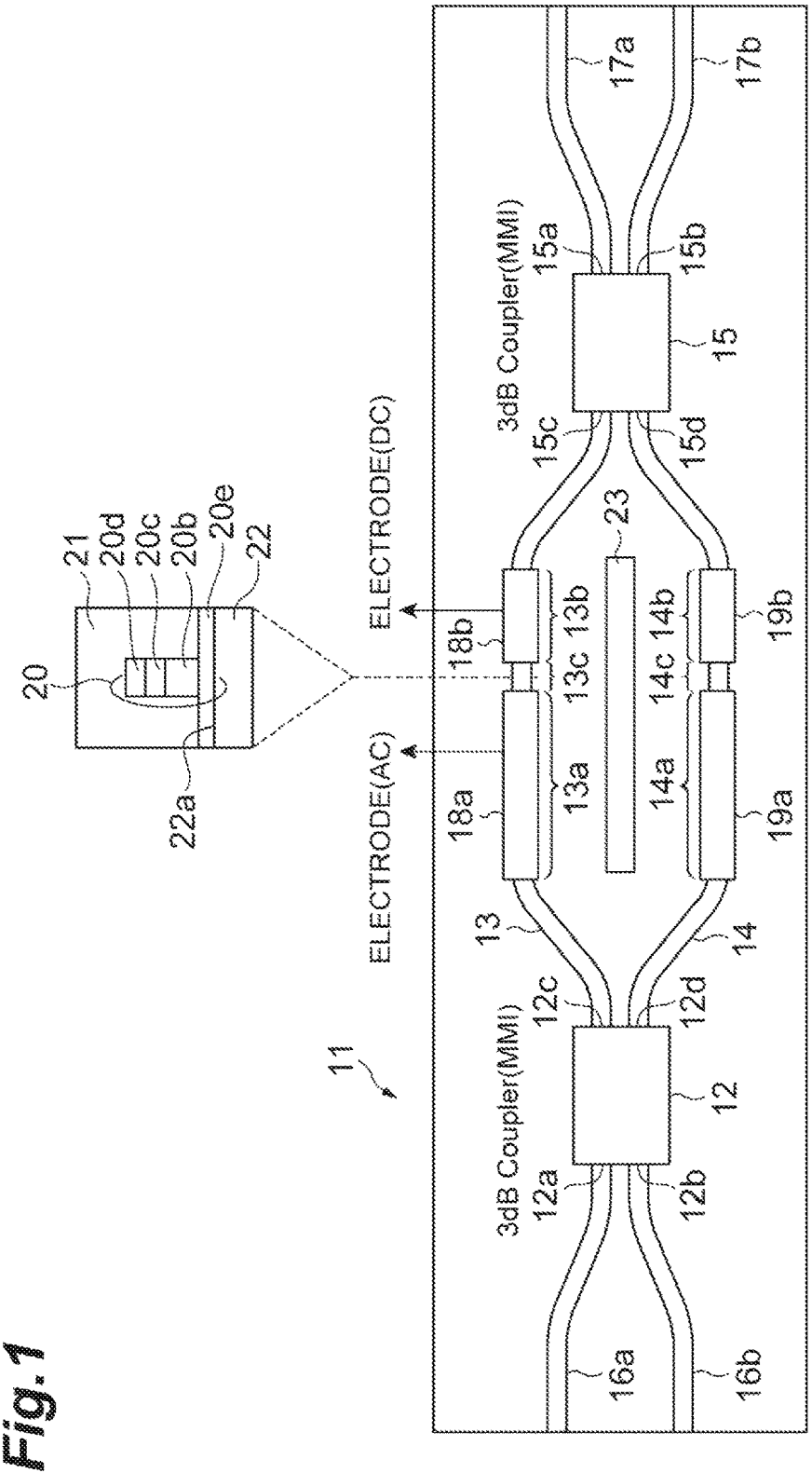

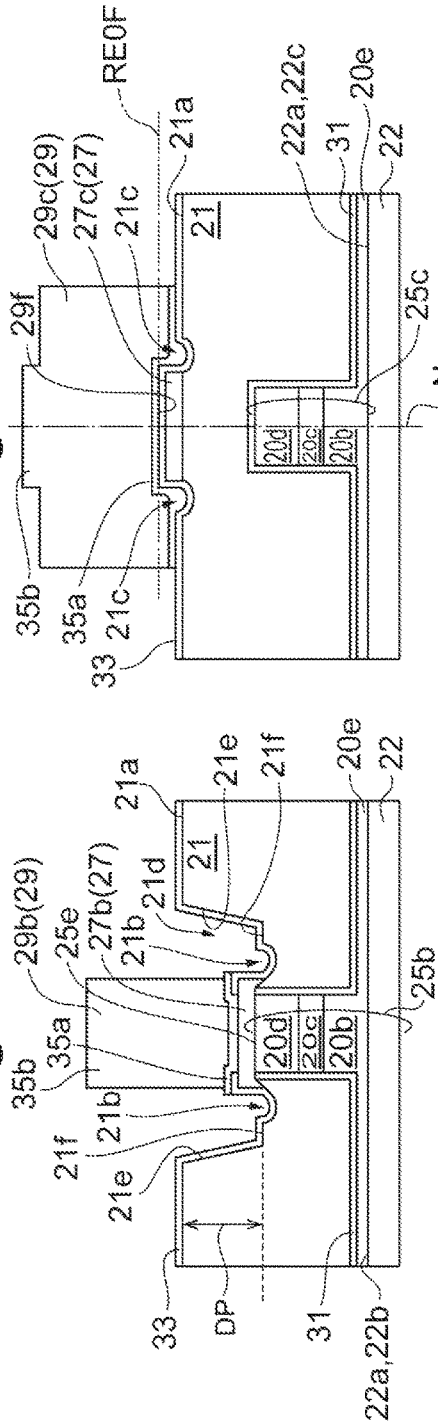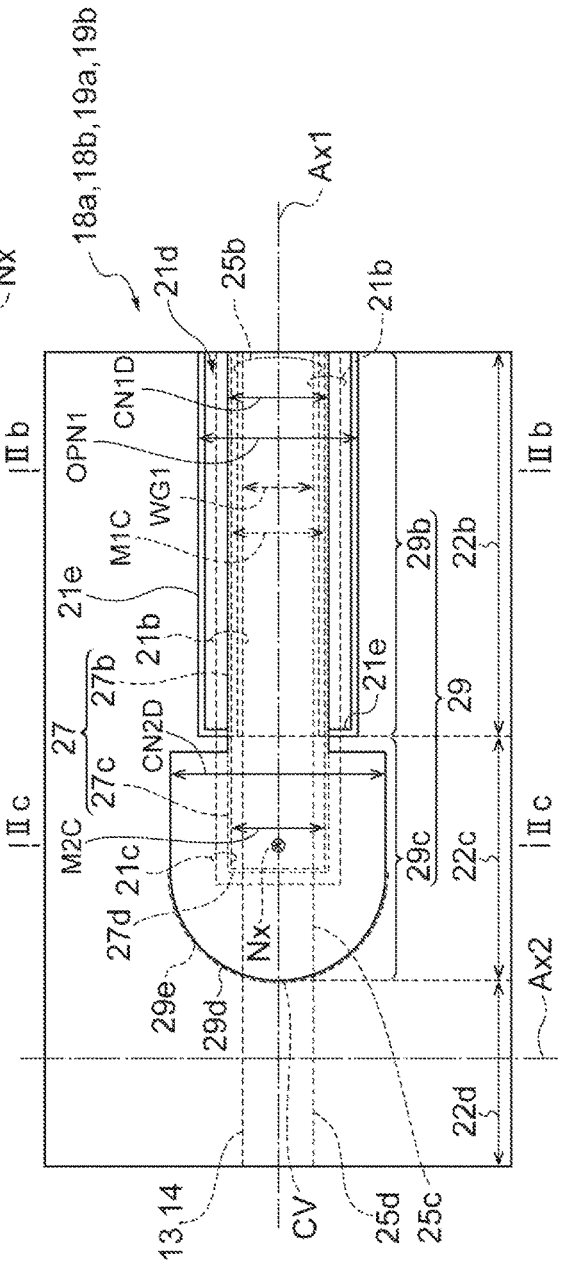

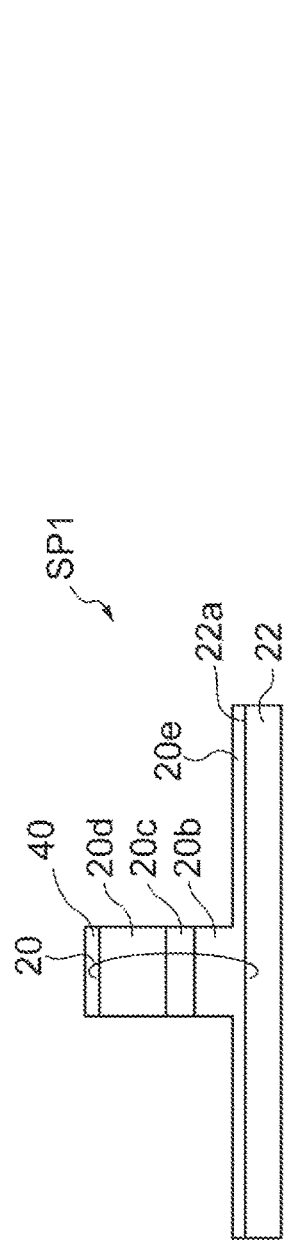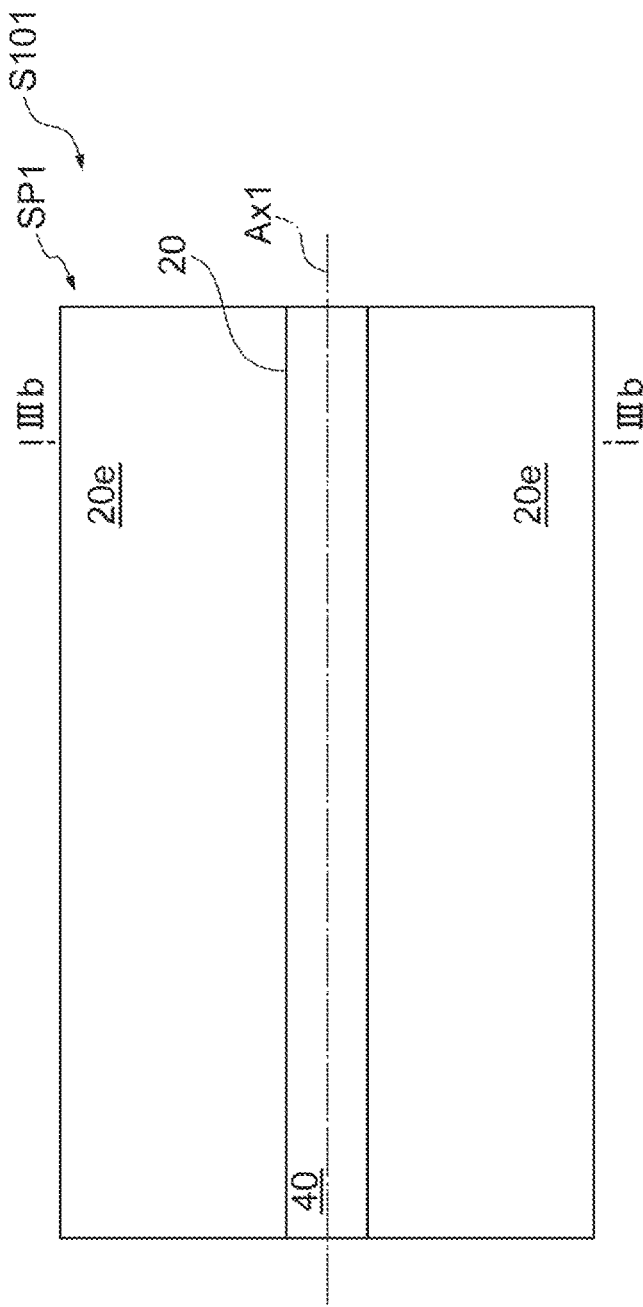
Fig.3B
Fig.3A

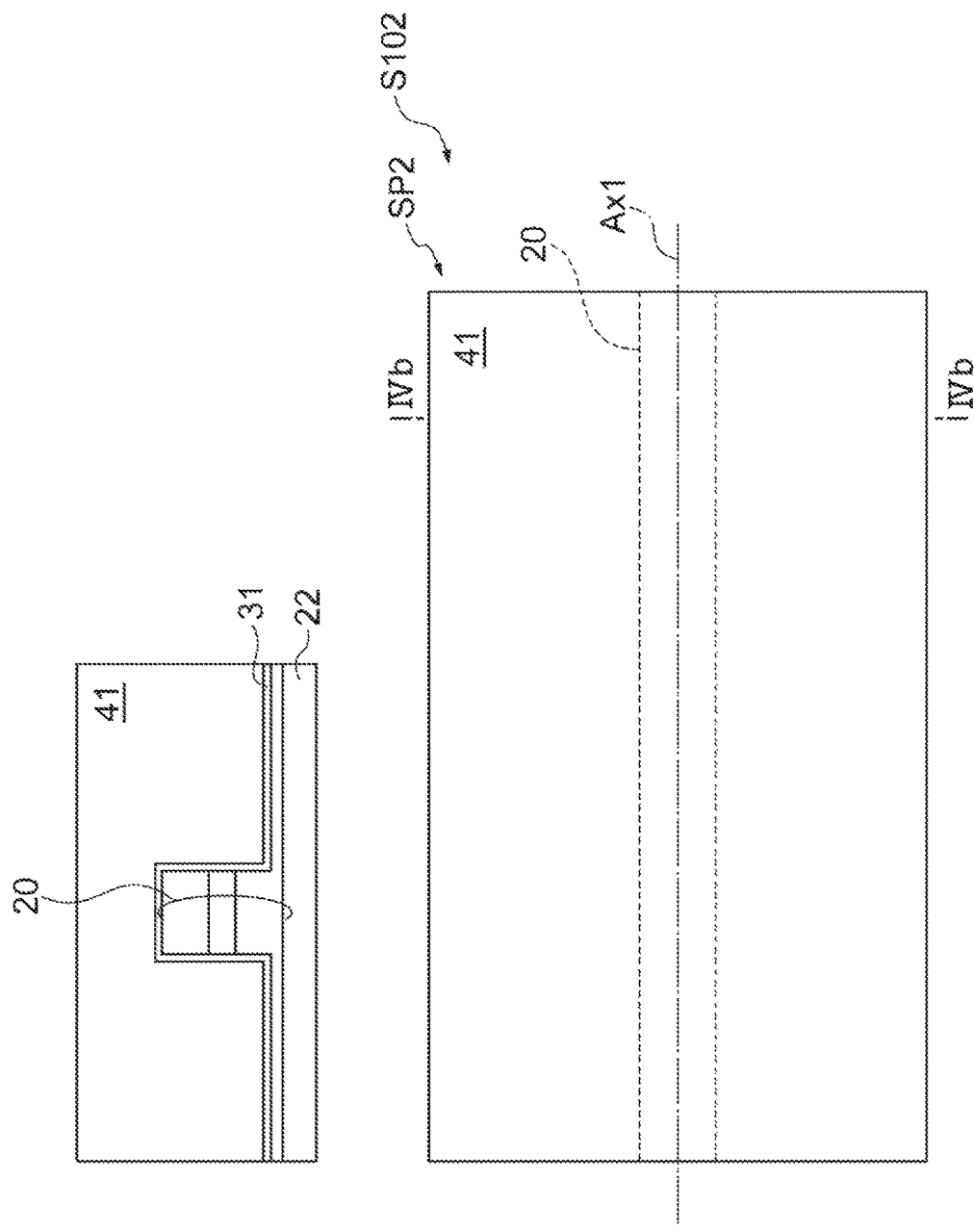

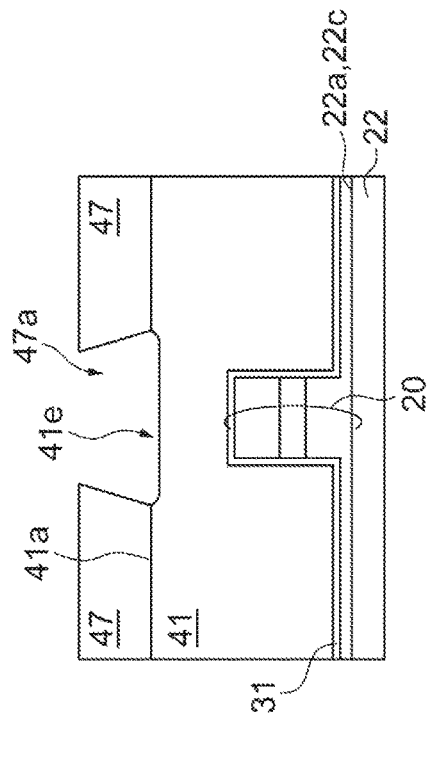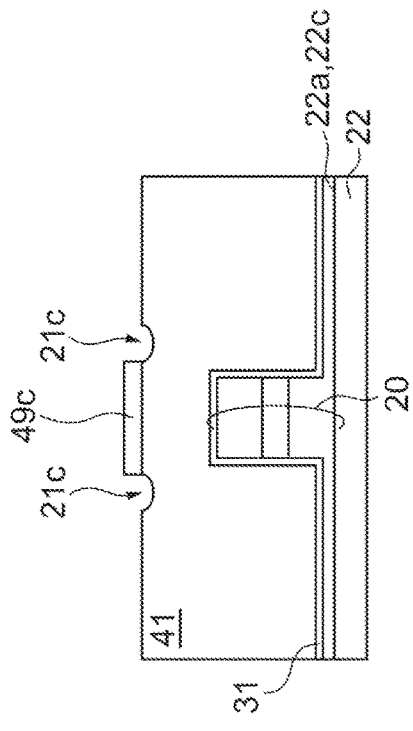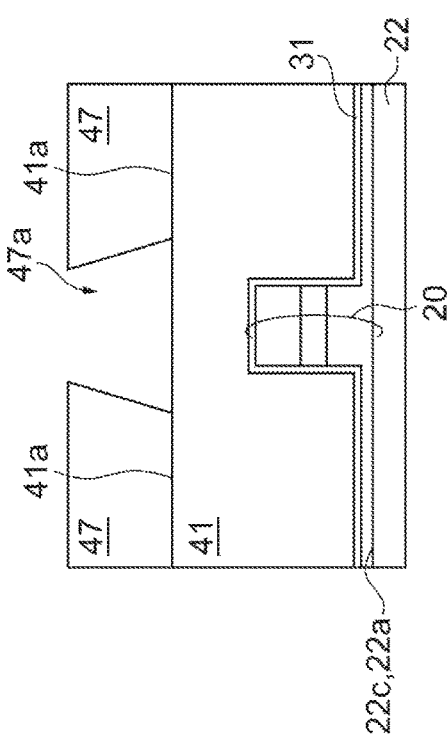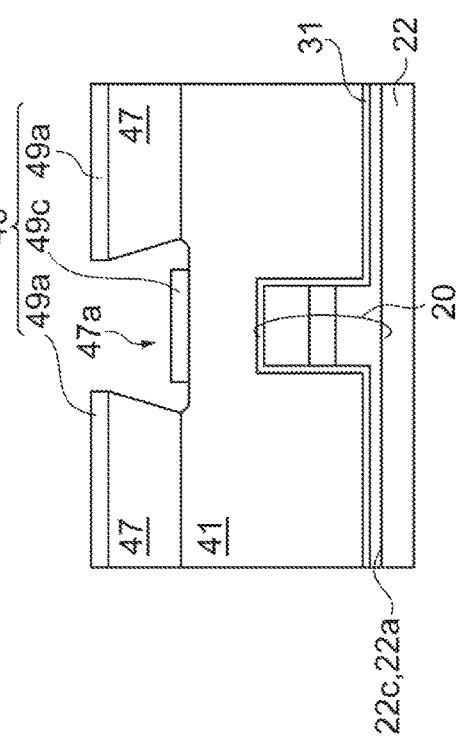

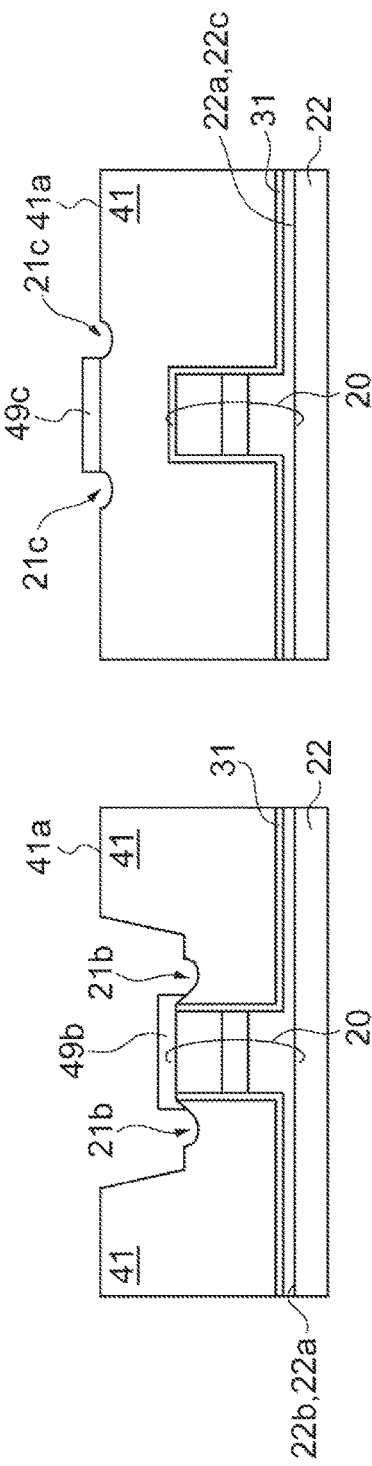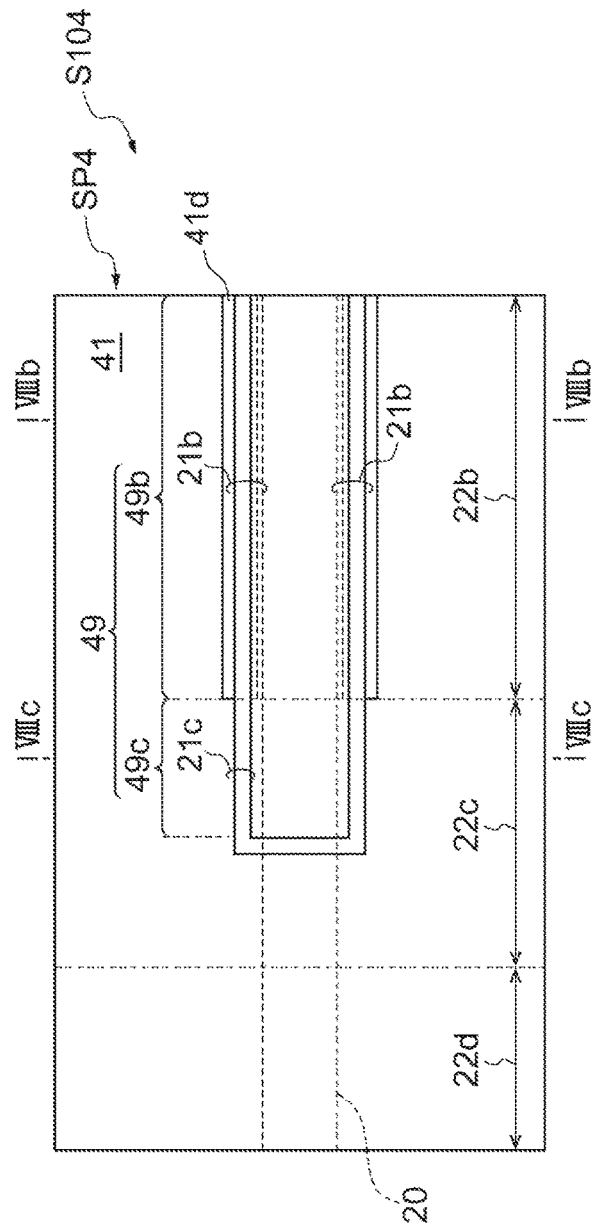

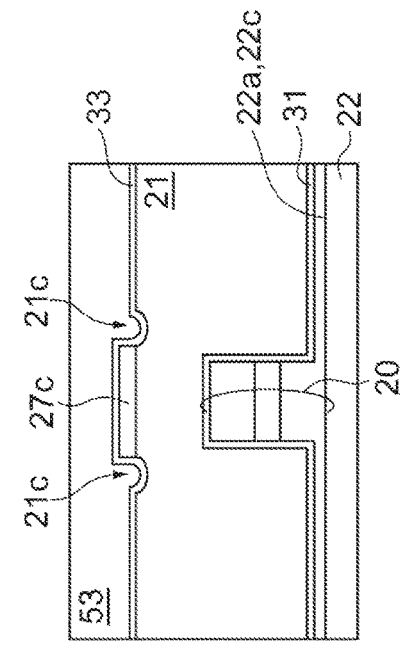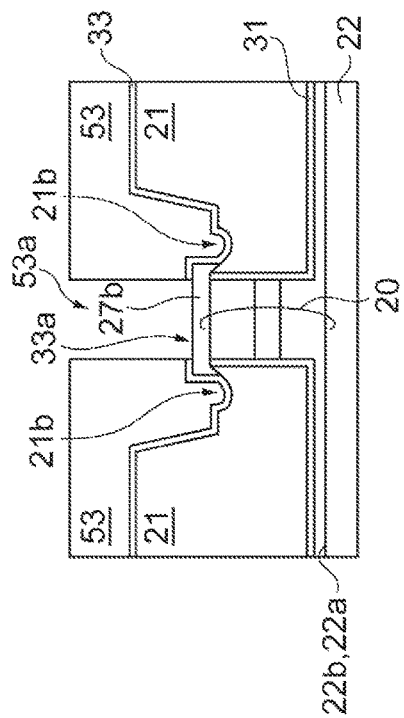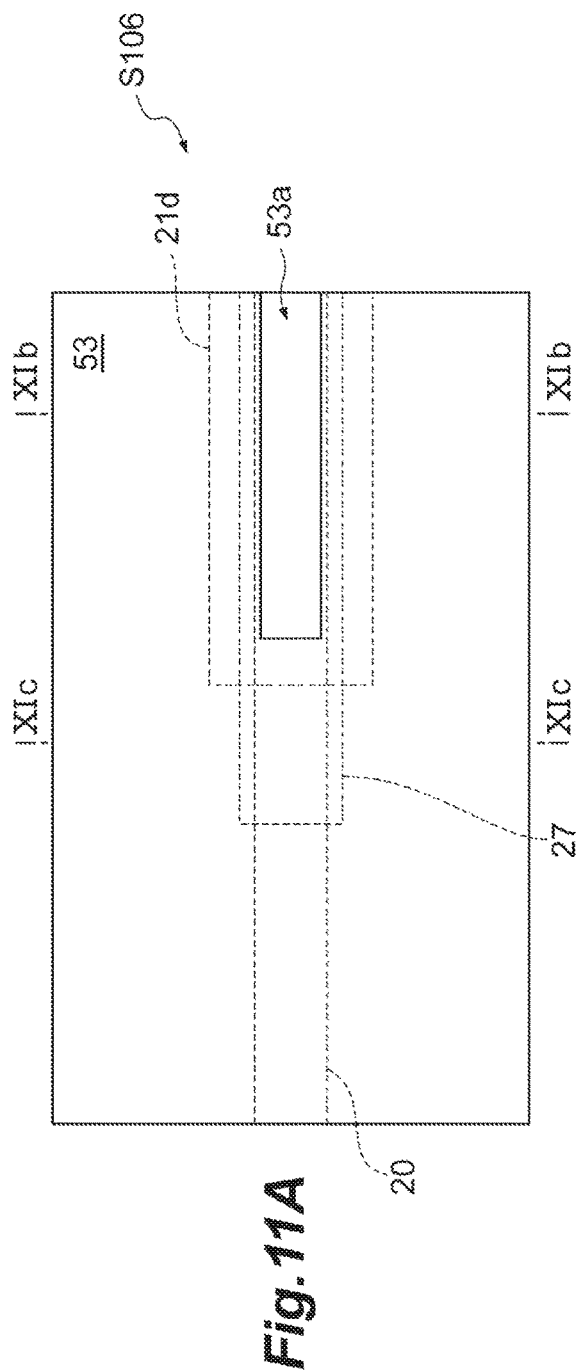

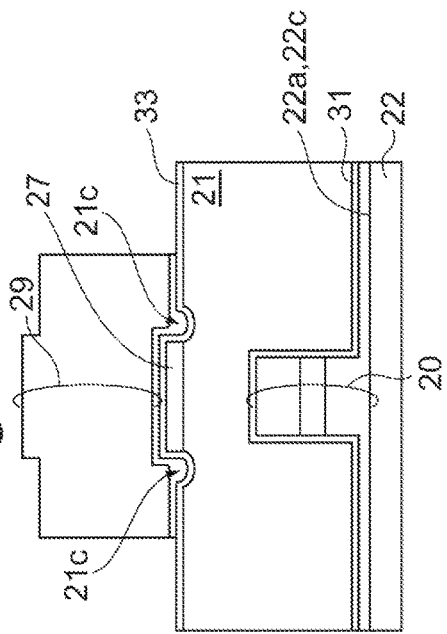
Fig.12C
Fig.12B
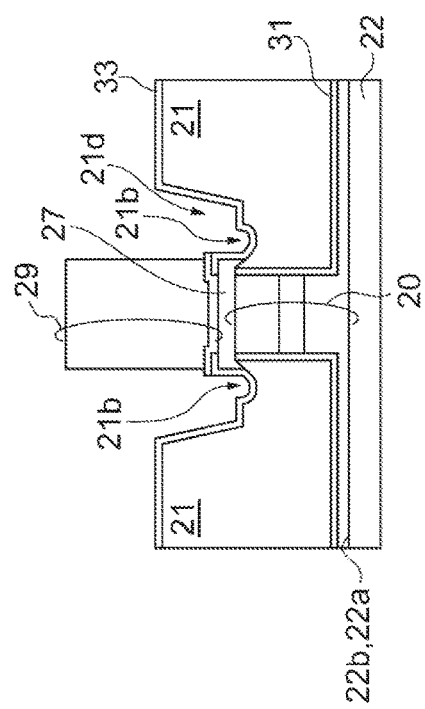
Fig.12A

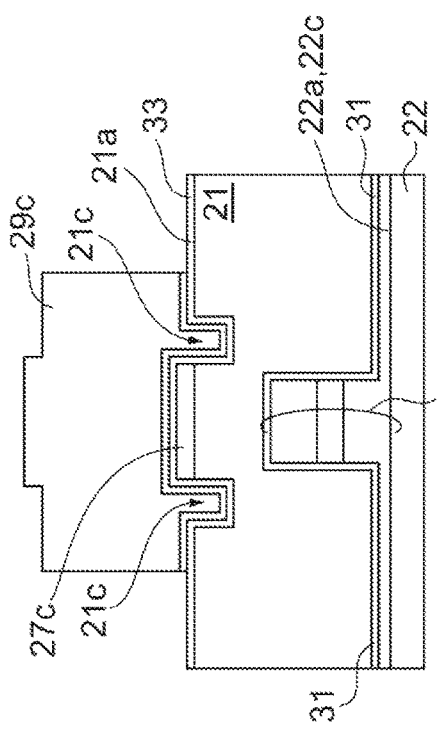
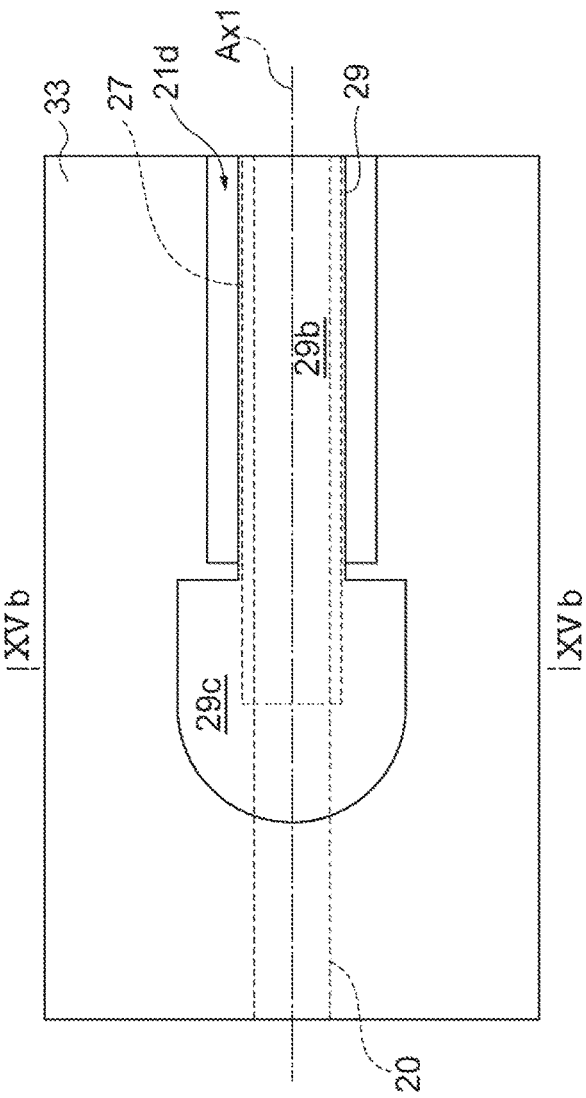
Fig.15B
Fig.15A

MACH-ZEHNDER MODULATOR, METHOD FOR FABRICATING MACH-ZEHNDER MODULATOR

BACKGROUND OF THE INVENTION

Field of the Invention

The present invention relates to a Mach-Zehnder modulator and a method for fabricating a Mach-Zehnder modulator. This application claims the benefit of priority from Japanese Patent Application No. 2016-075198 filed on Apr. 4, 2016, which is herein incorporated by reference in its entirety.

Related Background Art

Japanese Unexamined Patent Application Publication No. 2013-250527 discloses a semiconductor Mach-Zehnder modulator and a method for manufacturing a semiconductor Mach-Zehnder modulator.

SUMMARY OF THE INVENTION

A Mach-Zehnder modulator according to one aspect of the present invention includes: a substrate having a principal surface including a first area, a second area, and a third area, the first area, the second area, and the third area being arranged in a direction of a first axis; a semiconductor structure for an arm waveguide, the semiconductor structure having a first waveguide portion, a second waveguide portion, and a third waveguide portion, the first waveguide portion, the second waveguide portion, and the third waveguide portion being disposed on the first area, the second area, and the third area, respectively; an embedding resin body having an opening on the first waveguide portion and embedding the semiconductor structure on the principal surface; an ohmic electrode including a first ohmic electrode portion and a second ohmic electrode portion, the first ohmic electrode portion extending along the first waveguide portion and being connected to the first waveguide portion through the opening of the embedding resin body, and the second ohmic electrode portion being disposed on the embedding resin body in the second area; and a conductor including a first conductive portion and a second conductive portion, the first conductive portion extending along the first ohmic electrode portion in the first area, and the second conductive portion disposed on the embedding resin body in the second area, the embedding resin body having a first groove extending along an edge of the second ohmic electrode portion in the second area, and the second conductive portion having a width greater than that of the second ohmic electrode portion.

A method for fabricating a Mach-Zehnder modulator according to another aspect of the present invention includes steps of: preparing a substrate product including a semiconductor structure, the semiconductor structure including a first waveguide portion, a second waveguide portion, and a third waveguide portion disposed on a first area, a second area, and a third area, respectively; forming a resin body embedding the semiconductor structure of the substrate product; forming a contact opening in the resin body on the first area, the contact opening reaching the first waveguide portion; forming an ohmic electrode including a first ohmic electrode portion and a second ohmic electrode portion, the first ohmic electrode portion extending along the first waveguide portion, and the second ohmic electrode portion being disposed on the resin body in the second area; and forming an conductor including a first conductive portion and a second conductive portion in the first area, the first conductive portion extending along the first ohmic electrode portion, and the second conductive portion being disposed on the resin body in the second area, the second conductive portion having a width greater than that of the first waveguide portion, the step of forming an ohmic electrode including: forming a mask having a lift-off opening in the first area and the second area; carrying out plasm-etching of the resin body using the mask; growing a metal layer to form an ohmic electrode in the lift-off opening of the mask; after growing the metal layer, removing the mask; and after removing the mask, subjecting the resin body and the ohmic electrode to plasm.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

FIG. 1 is a view showing a Mach-Zehnder modulator according to the present embodiment.

FIGS. 2A, 2B and 2C are views showing an arm waveguide of the Mach-Zehnder modulator according to the present embodiment.

FIGS. 3A and 3B are schematic views showing a major step in a method for fabricating the Mach-Zehnder modulator according to the present embodiment.

FIGS. 4A and 4B are schematic views showing a major step in the method for fabricating the Mach-Zehnder modulator according to the present embodiment.

FIGS. 7A, 7B, 7C and 7D are schematic views showing major steps in the method for fabricating the Mach-Zehnder modulator according to the present embodiment.

FIGS. 8A, 8B and 8C are schematic views showing a major step in the method for fabricating the Mach-Zehnder modulator according to the present embodiment.

FIGS. 11A, 11B and 11C are schematic views showing a major step in the method for fabricating the Mach-Zehnder modulator according to the present embodiment.

FIGS. 12A, 12B and 12C are schematic views showing a major step in the method for fabricating the Mach-Zehnder modulator according to the present embodiment.

FIGS. 15A and 15B are views showing a Mach-Zehnder modulator according to the present embodiment.

DESCRIPTION OF THE EMBODIMENTS

Figure 5C:
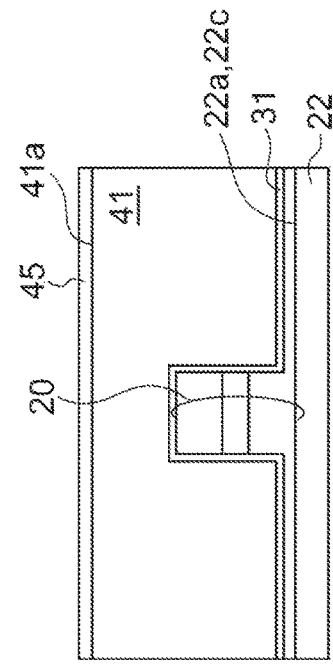
FIGS. 5A, 5B and 5C are schematic views showing a major step in the method for fabricating the Mach-Zehnder modulator according to the present embodiment.

The Mach-Zehnder modulator has an arm waveguide and an electrode, which includes an ohmic electrode and a conductor, and the arm waveguide is embedded with a resin body and makes contact with the electrode through the opening of the resin body. The electrode extends on the arm waveguide, and the opening of the resin body is terminated on the arm waveguide. The electrode in the opening extends across a difference in level, where the opening terminates, to climb the side of the resin body located at the difference in level to the top face of the resin body, and the electrode on the resin body has an end including a second conducting part, the height of which is greater than that of the electrode in the opening by the depth of the opening, i.e., forming a protruding part of the electrode. The protruding electrode part may receive unexpected external forces, which are applied to a product to be formed, in the fabricating and assembly processes. Such external forces may form defects in device characteristics and the appearance of the product, and such defective devices can be removed by screening. What is needed is to allow the electrode connected to the arm waveguide to have an increased mechanical strength.

An object of one aspect of the present invention is to provide a Mach-Zehnder modulator having a structure allowing an electrode, which is connected to the arm waveguide, to have an increased mechanical strength. An object of another aspect of the present invention is to provide a method for fabricating a Mach-Zehnder modulator, which can form an electrode having an increased mechanical strength.

Specific embodiments will be described below.

A Mach-Zehnder modulator according to an embodiment includes: a substrate having a principal surface including a first area, a second area, and a third area, the first area, the second area, and the third area being arranged in a direction of a first axis; a semiconductor structure for an arm waveguide, the semiconductor structure having a first waveguide portion, a second waveguide portion, and a third waveguide portion, the first waveguide portion, the second waveguide portion, and the third waveguide portion being disposed on the first area, the second area, and the third area, respectively; an embedding resin body having an opening on the first waveguide portion and embedding the semiconductor structure on the principal surface; an ohmic electrode including a first ohmic electrode portion and a second ohmic electrode portion, the first ohmic electrode portion extending along the first waveguide portion and being connected to the first waveguide portion through the opening of the embedding resin body, and the second ohmic electrode portion being disposed on the embedding resin body in the second area; and a conductor including a first conductive portion and a second conductive portion, the first conductive portion extending along the first ohmic electrode portion in the first area, and the second conductive portion disposed on the embedding resin body in the second area, the embedding resin body having a first groove extending along an edge of the second ohmic electrode portion in the second area, and the second conductive portion having a width greater than that of the second ohmic electrode portion.

In the Mach-Zehnder modulator, the arm waveguide has a semiconductor structure which is embedded with a resin body and makes contact with the electrode, including the ohmic electrode and the conductor, through the opening of the embedding resin body. The electrode extends on the arm waveguide and is terminated at a position on the arm waveguide. The electrode climbs a difference in level of the embedding resin body, which defines the opening, located at the edge of the opening of the embedding resin body, and extends from inside the opening of the embedding resin body onto the top face of the embedding resin body, and the second conductive portion is ended at the boundary between the second area and the third area. The second conducive portion is included by an end portion of the electrode, and climbs up a terminal part of the opening, so that the height of the end portion on the embedding resin body is greater than that of the electrode in the opening by the depth of the opening. The embedding resin body has a groove extending along the edge of the second ohmic electrode portion in the second area. The second conductive portion has a width larger than that of the second ohmic electrode portion, and extends on both side faces and the end face of the second ohmic electrode portion to reach the groove. The second conductive portion is disposed in the groove, and is supported therein by the surface of the groove and both side faces and the end face of the second ohmic electrode portion. These supports allow the protruding electrode to have resistance against unexpected external forces which may be applied thereto.

In the Mach-Zehnder modulator according to an embodiment, the embedding resin body has a second groove extending along an edge of the first ohmic electrode portion in the first area, and the first ohmic electrode portion is disposed in the second groove in the first area.

The Mach-Zehnder modulator provides the embedding resin body with a groove in the first area. The groove in the first area can enforce the support that the surface of the groove and both side faces and end face of the second ohmic electrode portion provide.

In the Mach-Zehnder modulator according to an embodiment, the second conductive portion has a terminal end disposed at a boundary between the second area and the third area, and the terminal end has a lower edge, and the lower edge has a part extending along a curve on a reference plane extending on a bottom of the second conductive portion and intersecting with an axis normal to the principal surface.

The Mach-Zehnder modulator provides the end portion of the second conductive portion with a lower edge which makes a curve on the reference plane, and the curved lower edge can enhance the resistance against the external forces.

A method for fabricating a Mach-Zehnder modulator according to an embodiment includes steps of: preparing a substrate product including a semiconductor structure, the semiconductor structure including a first waveguide portion, a second waveguide portion, and a third waveguide portion disposed on a first area, a second area, and a third area, respectively; forming a resin body embedding the semiconductor structure of the substrate product; forming a contact opening in the resin body on the first area, the contact opening reaching the first waveguide portion; forming an ohmic electrode including a first ohmic electrode portion and a second ohmic electrode portion, the first ohmic electrode portion extending along the first waveguide portion, and the second ohmic electrode portion being disposed on the resin body in the second area; and forming an conductor including a first conductive portion and a second conductive portion in the first area, the first conductive portion extending along the first ohmic electrode portion, and the second conductive portion being disposed on the resin body in the second area, the second conductive portion having a width greater than that of the first waveguide portion, forming an ohmic electrode including: forming a mask having a lift-off opening in the first area and the second area; carrying out plasm-etching of the resin body using the mask; growing a metal layer to form an ohmic electrode in the lift-off opening of the mask; after growing the metal layer, removing the mask; and after removing the mask, subjecting the resin body and the ohmic electrode to plasm.

The method of fabricating the Mach-Zehnder modulator forms a recessed resin face in the resin body in the lift-off opening, and the recess is formed by exposing resin in the first and second areas to plasma with a mask having the lift-off opening. Thereafter, metal for an ohmic electrode is deposited on the mask to form a metal film on the semiconductor structure and the recessed resin face on the mask and in the lift-off opening thereof. After depositing the metal, the mask is removed off to form the ohmic electrode, so that the resin surface of the resin body appears. The resin body has a shallow groove associated with the recessed resin face in the second area, and the ohmic electrode is disposed in the shallow groove. The entire surface of the resin body is subjected to plasma in the etching to plasma-etch the resin surface of the resin body, the recessed resin face, and the ohmic electrode with the ohmic electrode acting as a mask. The twice plasma-etching processes can form a groove, extending along the edge of the second ohmic electrode portion, in the resin body in the second area. The second conductive portion, which has a width larger than that of the second ohmic electrode portion, is formed on the second ohmic electrode portion in the groove extending along the edge of the second ohmic electrode portion.

In the method according to an embodiment, in the step of forming the ohmic electrode, a groove is formed in the resin body along an edge of the ohmic electrode in the second area, the method further includes steps of: prior to forming the conductor and after forming the ohmic electrode, forming a second mask having an opening on the groove in the second area; and etching the resin body using the second mask.

In the method of fabricating the Mach-Zehnder modulator, the etching with the second mask is useful to control the cross-sectional shape of the groove in the resin body.

Teachings of the present invention can be readily understood by considering the following detailed description with reference to the accompanying drawings shown as examples. Referring to the accompanying drawings, embodiments of a Mach-Zehnder modulator and a method for fabricating a Mach-Zehnder modulator according to the present invention will be described. To facilitate understanding, identical reference numerals are used, where possible, to designate identical elements that are common to the figures.

FIG. 1 is a view showing a Mach-Zehnder modulator according to the present embodiment. The Mach-Zehnder modulator 11 includes a first branching waveguide 12, a first arm waveguide 13, a second arm waveguide 14, and a second branching waveguide 15. The first branching waveguide 12 includes a first port 12a and a second port 12b which are optically coupled to a waveguide 16a and a waveguide 16b, respectively, and a third port 12c and a fourth port 12d which are optically coupled to the first optical waveguide 13 and the second arm waveguide 14, respectively. The second branching waveguide 15 includes a first port 15a and a second port 15b which are optically coupled to the waveguide 17a and the waveguide 17b, respectively, and a third port 15c and a fourth port 15d which are optically coupled to the first arm waveguide 13 and the second arm waveguide 14, respectively. The first branching waveguide 12 and the second branching waveguide 15 each may include, for example, a multimode interference device (MMI).

The Mach-Zehnder modulator 11 comprises a semiconductor structure 20 for an optical waveguide, an embedding resin body 21 and a substrate 22. The semiconductor structure 20 is provided on the principal surface 22a of the substrate 22, and the embedding resin body 21 buries the semiconductor structure 20. The semiconductor structure 20 includes a lower cladding layer 20b, an i-type core layer 20c, and an upper cladding layer 20d. The lower cladding layer 20b, the i-type core layer 20c, and the upper clad layer 20d are sequentially arranged on the substrate 22. The first branching waveguide 12, the first arm waveguide 13, the second arm waveguide 14, and the second branching waveguide 15 are buried with the embedding resin body 21. The upper cladding layer 20d may mount a contact layer thereon.

Lower cladding layer 20b: n-type InP.
I-type core layer 20c: AlGaInAs/AlInAs.
Upper cladding layer 20d: p-type InP.
Contact layer: p-type InGaAs.
Substrate 22: semi-insulating InP.
Embedding resin body 21: BCB resin.

The first arm waveguide 13 mounts a first upper electrode 18a (AC electrode) and a second upper electrode 18b (DC electrode) thereon. The first upper electrode 18a (AC electrode) is connected to the first portion 13a of the first arm waveguide 13, and the second upper electrode 18b is connected to the second portion 13b of the first arm waveguide 13. The first arm waveguide 13 has a third portion 13c provided between the first portion 13a of the first arm waveguide 13 and the second portion 13b of the first arm waveguide 13. The embedding resin body 21 has a first opening and a second opening which reach the respective upper faces of the first and second portions 13b and 13a of the first arm waveguide 13. The embedding resin body 21 covers the upper face of the third portion 13c. On the second arm waveguide 14, a third upper electrode 19a and a fourth upper electrode 19b are disposed. The third upper electrode 19a (AC electrode) is connected to the first portion 14a of the second arm waveguide 14, and the fourth upper electrode 19b (DC electrode) is connected to the second portion 14b of the second arm waveguide 14. A third portion 14c of the second arm waveguide 14 is disposed the first and second portions 14a and 14b of the second arm waveguide 14. The embedding resin body 21 has a third opening and a fourth opening, which reach the respective upper faces of the first and second portions 14a and 14b of the second arm waveguide 14. The embedding resin body 21 covers the top of the third portion 14c. The first arm waveguide 13 and the second arm waveguide 14 are connected to each other through a semiconductor region therebetween, which mounts a lower electrode 23 thereon.

Subsequently, the structure of the electrodes 18 and 19 (18a, 18b, 19a, and 19b) will be described with reference to FIGS. 2A, 2B and 2C. FIGS. 2A, 2B and 2C each show an arm waveguide of the Mach-Zehnder modulator according to the present embodiment. Specifically, FIG. 2A is a plan view showing the terminal end of the electrode connected to the arm waveguide. FIG. 2B is a cross sectional view taken along the IIb-IIb line shown in FIG. 2A, and FIG. 2C is a cross sectional view taken along the IIc-IIc line shown in FIG. 2A.

In the Mach-Zehnder modulator 11, the principal surface 22a of the substrate 22 includes a first area 22b, a second area 22c, and a third area 22d. The first area 22b, the second area 22c, and the third area 22d are sequentially arranged in the direction of the first axis Ax1 indicating the direction in which the arm waveguide extends. The semiconductor structure 20 for the first arm waveguide 13 (the second arm waveguide 14) has a first waveguide portion 25b, a second waveguide portion 25c and a third waveguide portion 25d. The first waveguide portion 25b, the second waveguide portion 25c, and the third waveguide portion 25d are disposed on the first area 22b, the second area 22c, and the third area 22d, respectively. The embedding resin body 21 embeds the first arm waveguide 13 (14) on the principal surface 22a, and covers the second waveguide portion 25c and the third waveguide portion 25d such that the first opening 21d is located on the first waveguide portion 25b. The depth DP of the first opening 21d may range, for example, from 100 to 500 nm.

Each of the electrodes 18 and 19 (18a, 18b, 19a, and 19b) includes an ohmic electrode 27 and a conductor 29. The ohmic electrode 27 includes a first ohmic electrode portion 27b and a second ohmic electrode portion 27c. The first ohmic electrode portion 27b extends along the first waveguide portion 25b and the first axis Ax1 in the first area 22b. The first ohmic electrode portion 27b is connected to the first waveguide portion 25b of the first arm waveguide 13 (14) through the first opening 21d of the embedding resin body 21. The second ohmic electrode portion 27c is disposed on the embedding resin body 21 in the second area 22c. The ohmic electrode 27 is not disposed on the embedding resin body 21 in the third area 22d. The conductor 29 includes a first conductive portion 29b and a second conductive portion 29c. The first conductive portion 29b extends in the direction of the first axis Ax1 along the first ohmic electrode portion 27b in the first area 22b. The second conductive portion 29c is disposed on the second ohmic electrode portion 27c and the embedding resin body 21 in the second area 22c. In the first area 22b, the first opening 21d has a width OPN1 larger than the width WG1 of the first waveguide portion 25b. The first ohmic electrode portion 27b has a width M1C larger than the width WG1 of the first waveguide portion 25b. The first conductive portion 29b has a width CN1D larger than the width WG1 of the first waveguide portion 25b. The second conductive portion 29c has a width CN2D larger than the width M2C of the second ohmic electrode portion 27c. These widths are defined in the direction of the second axis Ax2 intersecting with the first axis Ax1. In the second area 22c, the second ohmic electrode portion 27c has an end portion 27d where the ohmic electrode 27 terminates in the second area 22c. The second conductive portion 29c has an end portion 29d where the conductor 29 terminates in the second area 22c.

In the first area 22b, the embedding resin body 21 has a first groove 21b extending along the edge of the top face 25e of the first waveguide portion 25b, and the first groove 21b is disposed on the bottom face of the first opening 21d. In the second area 22c, the embedding resin body 21 has a second groove 21c extending along the edge of the second ohmic electrode portion 27c, and the second groove 21c is disposed on the principal surface 21a of the embedding resin body 21. At the terminal end of the first opening 21d, the first groove 21b is connected to the second groove 21c. The first groove 21b is formed in a self-aligned manner with the semiconductor structure 20 of the arm waveguide, and the second groove 21c is formed in a self-aligned manner with the second ohmic electrode portion. The width of the first groove 21b is different from that of the second groove 21c.

In the Mach-Zehnder modulator 11, the first arm waveguide 13 (14) is buried with the embedding resin body 21, and is in contact with the electrodes 18 and 19 (18a, 18b, 19a, and 19b), which includes the ohmic electrode 27 and the conductor 29, through the first opening 21d of the embedding resin body 21. The electrodes 18 and 19 (18a, 18b, 19a, and 19b) extend on the first arm waveguide 13 (the second arm waveguide 14) and have respective terminal ends on the first arm waveguides 13 (14). In the electrodes 18 and 19 (18a, 18b, 19a, and 19b), the first conductive portion 29b climbs over a difference in level 21e that defines the first opening 21d in the embedding resin body 21, and extends outward from the first opening 21d of the embedding resin body 21 onto the principal surface 21a of the embedding resin body 21 and the first conductive portion 29b is connected to the second conductive portion 29c thereon. The second conductive portion 29c extends on the principal surface 21a. The second conductive portion 29c has a terminal end 29d in the second area 22c. The electrodes 18 and 19 (18a, 18b, 19a, and 19b) extend along the side face of the terraced resin to climb up the difference in level 21e located at the terminal end of the first opening 21d, and extend on the principal surface 21a of the embedding resin body 21, and the level difference in height of the electrodes 18 and 19 (18a, 18b, 19a, and 19b) between the inside and the outside of the first opening 21d makes the second conductive portion 29c (electrode end portion) raised. The embedding resin body 21 has a second groove 21c extending along the edge of the second ohmic electrode portion 27c in the second area 22c. The width CN2D of the second conductive portion 29c is larger than the width M2C of the second ohmic electrode portion 27c, and as shown in FIG. 2C, the second conductive portion 29c extends along both side faces and the end face of the second ohmic electrode portion 27c to reach the second groove 21c. The second conductive portion 29c is supported by the both side faces and end face of the second ohmic electrode portion 27c and the surface (side and/or bottom) of the second groove 21c. These supports can protect the second conductive portion 29c (protruding electrodes 18 and 19 (18a, 18b, 19a, and 19b)) against unexpected external forces which may be applied thereto in the fabricating and assembly processes.

The first groove 21b of the embedding resin body 21 extends along the edge of the first waveguide portion 25b in the first area 22b, and the first groove 21b of the embedding resin body 21 is away from the lower edge of the side of the first opening 21d, which extends along the first axis Ax1. The resin bottom face in the first opening 21d includes a flat face 21f connecting the first groove 21b to the lower edge of the side of the first opening 21d, and the flat face 21f extends in the direction of the first axis Ax1 in the first opening 21d. The first ohmic electrode portion 27b is disposed in the first groove 21b in the first area 22b. The embedding resin body 21 has a first groove 21b, which is continuous with the second groove 21c in the second area 22c, in the first area 22b. The first groove 21b in the first area 22b enforces the supporting of the second conductive portion 29c that the surface of the second groove 21c and both side faces and end faces of the second ohmic electrode portion 27c provide.

The second conductive portion 29c has a terminal end portion 29d on the embedding resin body 21 in the second area 22c, and the lower edge of the terminal end portion 29d has a part which extends along a curve defined on a reference plane RE0F, which extends at the level of the lower face 29f of the second conductive portion 29c and intersects with the axis Nx normal to the principal surface 22a. The second conductive portion 29c, which provides the lower edge of the terminal end portion 29d with a part 29e extending along the curve CV defined on the reference plane RE0F, can prevent the electrode from peeling off, as compared to a structure where the lower edge of the end portion has a corner, and can provide the ends of the electrodes 18 and 19 (18a, 18b, 19a, and 19b) with higher resistance against external forces. The width of the first conductive portion 29b is substantially the same as that of the first ohmic electrode portion 27b, and the maximum width of the second conductive portion 29c is larger than the maximum width of the second ohmic electrode portion 27c.

As shown in FIGS. 2A, 2B and 2C, the semiconductor structure 20 has a mesa shape. In the semiconductor structure 20, the lower cladding layer 20b, the i-type core layer 20c, and the upper cladding layer 20d are arranged in the direction of the normal axis Nx. The surface of the semiconductor structure 20 is covered with a first inorganic insulating film 31. The first inorganic insulating film 31 includes, for example, a silicon-based inorganic insulating material (specifically, silicon oxide, silicon nitride, or silicon oxynitride). In the first area 22b, the first inorganic insulating film 31 covers the sides of the first waveguide portion 25b and the top face of the semiconductor region 20e, which mounts the semiconductor mesa, and has an opening located on the top face of the first waveguide portion 25b. The top face of the first waveguide portion 25b makes contact with the electrodes 18 and 19 (18a, 18b, 19a, and 19b) through the first opening 21d, and the opening that is located on the top face of the first waveguide portion 25b. In the second and third areas 22c and 22d, the first inorganic insulating film 31 covers the surface of the semiconductor region 20e and the sides and the top faces of the second waveguide portion 25c and the third waveguide portion 25d.

The embedding resin body 21 is provided on the first inorganic insulating film 31 so as to bury the semiconductor structure 20. The principal surface 21a of the embedding resin body 21 is covered with the second inorganic insulating film 33. The second inorganic insulating film 33 includes, for example, a silicon-based inorganic insulating material (specifically, silicon oxide, silicon nitride, or silicon oxynitride).

In the first area 22b, the second inorganic insulating film 33 has an opening on the top face of the first ohmic electrode portion 27b located on the first waveguide portion 25b, and covers the principal surface 21a of the embedding resin body 21 and the face in the first opening 21d. In the second area 22c, the second inorganic insulating film 33 covers the principal surface 21a of the embedding resin body 21 and the top and side faces of the second ohmic electrode portion 27c. The second inorganic insulating film 33 makes contact with the top and side faces of the second ohmic electrode portion 27c, and the second conductive portion 29c is disposed on the second inorganic insulating film 33 and the second ohmic electrode portion 27c and is in contact with the second inorganic insulating film 33.

In the present embodiment, the conductor 29 includes a seed layer 35a and a metal layer 35b. The seed layer 35a includes, for example, TiW and Au, and the metal layer 35b includes, for example, Au (plating gold). The ohmic electrode 27 includes, for example, Ti/Pt/Au. The second inorganic insulating film 33 covers the top and side faces of the second ohmic electrode portion 27c and the principal surface 21a of the embedding resin body 21 in the second area 22c, so that the seed layer 35a and the second inorganic insulating film can improve the adhesion between the second conductive portion 29c and the embedding resin body 21.

In the electrodes 18 and 19 (18a, 18b, 19a, and 19b) in which the width of the second conductive portion 29c is larger than that of the second ohmic electrode portion 27c, the second conductive portion 29c is in contact with the second inorganic insulating film 33 located in the second groove 21c, and climbs up beyond the second groove 21c to make contact with the second inorganic insulating film 33 on the embedding resin body 21. Such a structure in each of the electrodes 18 and 19 (18a, 18b, 19a, and 19b) can enhance respective mechanical strengths at the ends of the electrodes 18 and 19 (18a, 18b, 19a, and 19b).

With reference to FIGS. 3A to 14, a method of fabricating a Mach-Zehnder modulator will be described below. In order to facilitate understanding, the following description will use reference numerals given in FIG. 1 and FIGS. 2A, 2B and 2C, where possible. FIG. 3A shows a plan view showing the step of forming a waveguide mesa, and FIG. 3B is a cross sectional view taken along the line IIIb-IIIb shown in FIG. 3A. In step S101, a wafer product SP1 is prepared. The wafer product SP1 includes a semiconductor structure 20 and a substrate 22 for use in forming the optical waveguides of the Mach-Zehnder modulator 11. The semiconductor structure 20 has a mesa shape and is provided on the principal surface 22a of the substrate 22. The semiconductor structure 20 has a height of, for example, 2.0 to 3.5 micrometers, and in the present embodiment, 2.75 micrometers. The semiconductor structure 20 includes a lower cladding layer 20b, an i-type core layer 20c, and an upper cladding layer 20d , which are in sequence arranged on the substrate 22. A mask 40 is formed on the upper face of the mesa-shaped waveguide portion of the wafer product SP1. The mask 40 is used to dry-etch the epitaxial substrate to produce the wafer product SP1. The mask 40 may include a film of silicon-based inorganic insulating material, such as SiN. The epitaxial substrate comprises semiconductor layers for the lower cladding layer 20b, the i-type core layer 20c, and the upper cladding layer 20d. A part of the lower cladding layer 20b is removed by dry-etching with another mask to provide a portion in which the principal surface 22a of the substrate 22 appears. The Mach-Zehnder modulators 11 can be separated from each other by removing a desired portion of the lower cladding layer 20b, made of a conductive semiconductor, in fabricating an integrated device including Mach-Zehnder modulators 11 on the substrate 22.

FIG. 4A is a plan view showing the step of forming a resin body, and FIG. 4B is a cross sectional view taken along the line IVb-IVb shown in FIG. 4A. In step S102, the first inorganic insulating film 31 is grown on the entire surface of the wafer product SP1 by a CVD method, and the resin body 41 is formed on the first inorganic insulating film 31 by coating and baking. These processes can provide a substrate product SP2, which is produced from the wafer product SP1. The resin body 41 can be made of, for example, a BCB resin. The first inorganic insulating film 31 may be a silicon oxide film with a thickness of, for example, 200 nanometers. The BCB resin is thick enough to cover the sides and top face of the semiconductor structure 20 and has a thickness in the range of 1000 to 4000 nanometers on the top of the semiconductor structure 20. The resin body 41 buries the semiconductor structure 20.

Figure 5B:
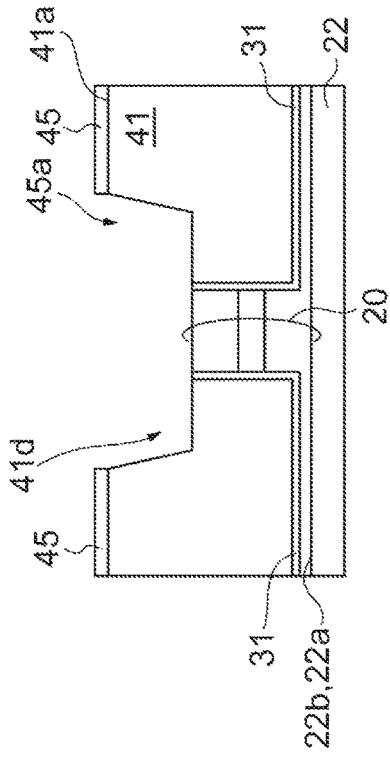
Figure 5A:
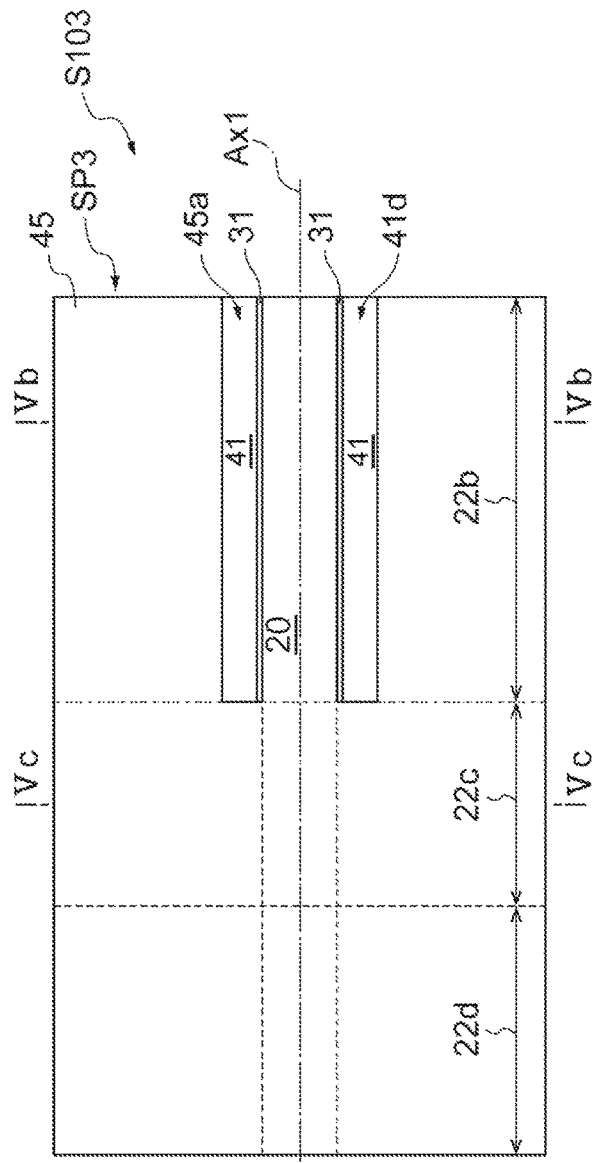

FIG. 5A is a plan view showing the step of forming an opening in the resin body. FIG. 5B is a cross sectional view taken along the line Vb-Vb shown in FIG. 5A, and FIG. 5C is a cross section view taken along the line Vc-Vc shown in FIG. 5A. In step S103, the resin body 41 is processed to form a first opening. For this processing, a mask 45 is formed on the substrate product SP2. The mask 45 has a pattern with an opening 45*a* located on the top face 41*a* of the resin body 41 in the first area 22*b*, and covers the top face 41*a* of the resin body 41 in the second area 22*c* and the third area 22*d*. The mask 45 may include, for example, photoresist. The resin body 41 and the first inorganic insulating film 31 are etched with the mask 45 to form the first opening 41*d* in the resin body 41. Gas for use in the etching includes $CF_4/O_2$. At the first opening 41*d* of the resin body 41, the top face of the semiconductor structure 20 appears. The first opening 41*d* has a width larger than the width (the mesa width) of the semiconductor structure 20. The sides of the semiconductor structure 20 are covered with the first inorganic insulating film 31. These processes complete a substrate product SP3, which is produced from substrate product SP2.

With reference to FIGS. 6A, 6B, 6C and 6D and FIGS. 7A, 7B, 7C and 7D, exemplary processes of forming grooves in the resin body 41 and forming the ohmic electrode 27 will be described below. More specifically, in step S104, the process of forming the ohmic electrode 27 is applied to the substrate product, and the application of the process can also fabricate the first and second grooves 21*c* and 21*b* in the resin body 41 to form the embedding resin body 21.

FIGS. 6A to 6D show the progress of the process in the first area, and FIGS. 7A to 7D show the progress of the process in the second area. Specifically, FIGS. 6A to 6D are cross sectional views, taken along the line Vb-Vb shown in FIG. 5A, each showing the progress in the fabrication. FIGS. 7A to 7D are cross sectional views, taken along the line Vc-Vc shown in FIG. 5A, each showing the progress in the fabrication.

Figure 6A:
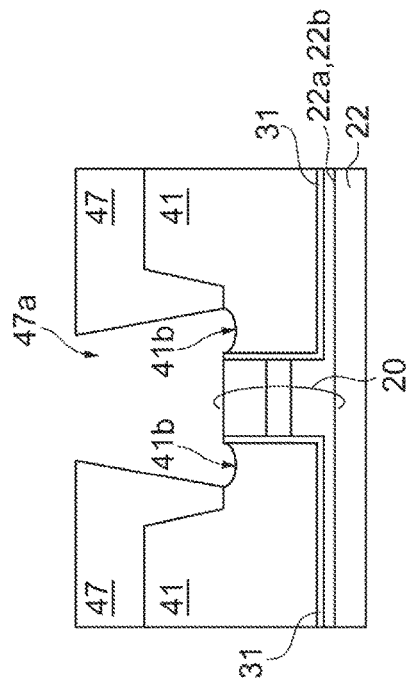
FIGS. 6A, 6B, 6C and 6D are schematic views showing major steps in the method for fabricating the Mach-Zehnder modulator according to the present embodiment.

As shown in FIGS. 6A and 7A, a lift-off mask 47 is formed on the substrate product SP3. The lift-off mask 47 has an opening 47*a* in an area where an ohmic electrode is to be formed. The opening 47*a* extends in the direction of the first axis Ax1 in the first and second areas 22*b* and 22*c*, and terminates in the second area 22*c*. The opening 47*a* is not disposed in the third area 22*d*. The material of the lift-off mask 47 may be made of, for example, photoresist. The top size of the opening 47*a* at the top thereof is smaller than that of the bottom opening 47*a* at the bottom thereof. The top size of the opening 47*a* is associated with the width of the ohmic electrode to be formed, and the difference between the top and bottom sizes of the opening 47*a* causes a deposited metal film for the ohmic electrode to be separated around the upper edge of the opening 47*a*. The difference in opening size allows, on the first area 22*b*, the resin body 41 covering the semiconductor structure 20, the upper ends of the first inorganic insulating film 31 covering the sides of the semiconductor structure 20, and the top face of the semiconductor structure 20 to appear in the opening 47*a*. On the second area 22*c*, the surface of the resin body 41 covering the semiconductor structure 20 appears at the lower end of the opening 47*a*. The position of the bottom edge of the resist defining the lower end of the opening 47*a* is associated with the respective positions of the first and second grooves to be formed.

Figure 6B:
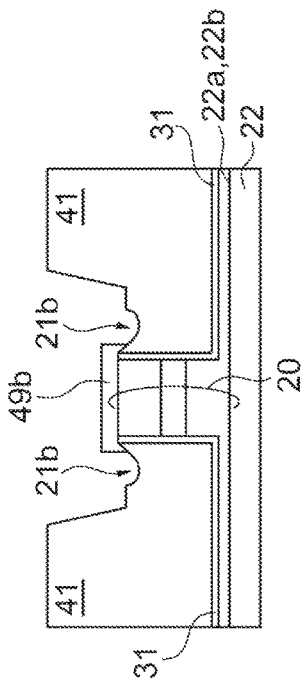

As shown in FIGS. 6B and 7B, the resin body 41 is processed by etching by use of oxygen plasma with the lift-off mask 47. In the first area 22*b*, the oxygen plasma etches the top face 41*a* of the resin body 41 and the resist of the lift-off mask 47 that appear in the opening 47*a* of the lift-off mask 47. In the second area 22*c*, the oxygen plasma etches the top face 41*a* of the resin body 41 and the resist of the lift-off mask 47 that appear in the opening 47*a* of the lift-off mask 47. In the first area 22*b*, the first grooves 41*b* is formed so as to extend along the edges of the top face of the semiconductor structure 20 (specifically, the upper edges of the first inorganic insulating film 31 covering the sides of the semiconductor structure 20). In the second area 22*c*, a recess 41*e* is formed in the resin body 41 in the entire opening 47*a*. The recess 41*e* is depressed with respect to the top face 41*a* of the resin body 41.

Figure 6C:
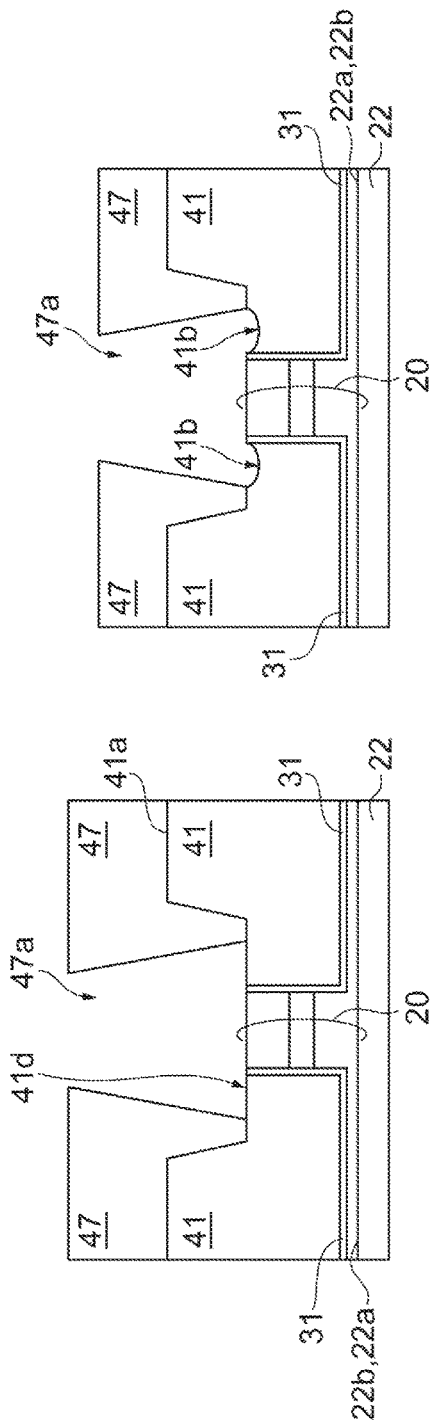

As shown in FIGS. 6C and 7C, metal is deposited on the lift off mask 47 to form a metal film, and the metal film thus deposited is patterned with the lift off mask 47 for the ohmic electrode. In the first area 22*b*, the first ohmic electrode portion 49*b* is formed in the first groove 41*b* of the resin body 41 on the top of the semiconductor structure 20 and the upper edges of the first inorganic insulating film 31 covering the sides of the semiconductor structure 20. In the second area 22*c*, the second ohmic electrode portion 49*c* is formed in the recess 41*e* of the resin body 41, which appears in the opening 47*a*. In the first area 22*b*, the second area 22*c* and the third area 22*d*, a metal deposition 49*a* is also formed on the lift-off mask 47.

Figure 6D:
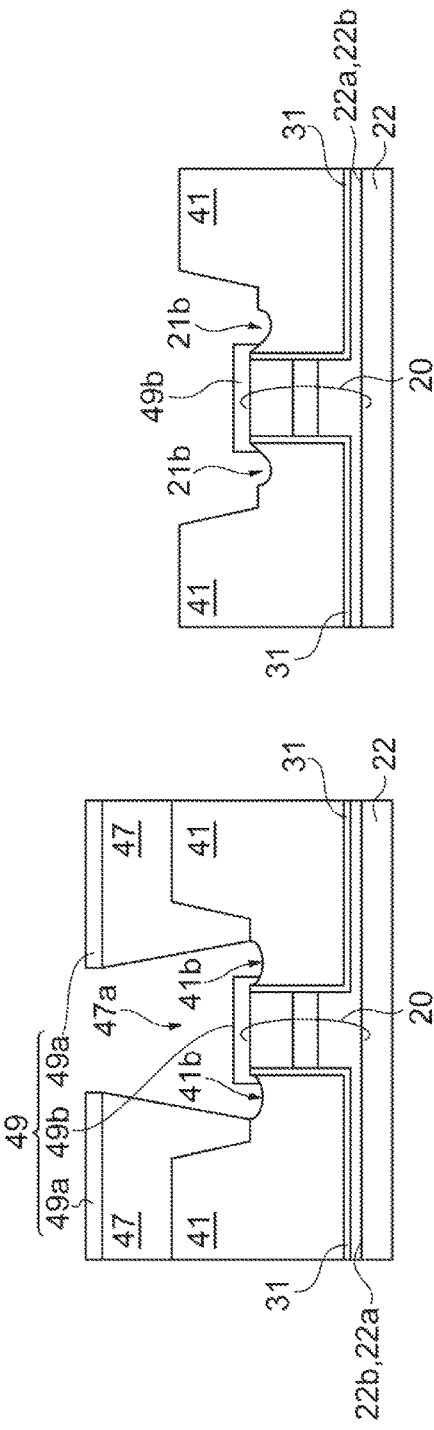

As shown in FIGS. 6D and 7D, removing the lift-off mask 47 forms the first ohmic electrode portion 49*b* left in the first area 22*b*, and the second ohmic electrode portion 49*c* left in the second area 22*c*. The metal 49*a* deposited on the lift-off mask 47 is removed together therewith. Processing the resin body 41 by etching with oxygen plasma follows removing the lift-off mask 47. The first ohmic electrode portion 49*b* covers the upper edges of the first inorganic insulating film 31 covering the side faces of the semiconductor structure 20. In the first area 22*b*, the oxygen plasma etches both the top face 41*a* of the resin body 41 and the first grooves 41*b* of the resin body 41 equally. This etching forms, with the first ohmic electrode portion 49*b* working as a mask, the first grooves 21*b* at the edges of the first ohmic electrode portion 49*b* in the first area 22*b*. In contrast, in the second area 22*c*, the oxygen plasma also etches both the recess 41*e* of the resin body 41 and the top face 41*a* of the resin body 41. This etching forms, with the second ohmic electrode portion 49*c* working as a mask, the top face 41*a* of the resin body 41 and the surface (exposed surface) of the recess 41*e*, which are not covered with the second ohmic electrode portion 49*c* in the second area 22*c*, to provide the second groove 21*c* along the edge of the second ohmic electrode portion 49*c*. In the second area 22*c*, the second groove 21*c* is formed self-aligned with the second ohmic electrode portion 49*c* by etching over the entire opening 47*a* of the lift-off mask 47.

The above process completes a substrate product SP4. FIG. 8A is a plan view showing the substrate product SP4 in the step of forming the ohmic electrode and the first and second grooves in the resin body. FIG. 8B is a cross sectional view, taken along the line VIIIb-VIIIb shown in FIG. 8A, and FIG. 8C is a cross sectional view taken along the line VIIIc-VIIIc shown in FIG. 8A.

Figures 9B, 9C:
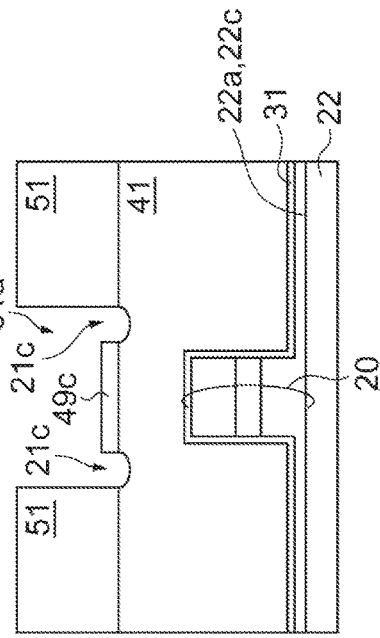
FIGS. 9A, 9B and 9C are schematic views showing a major step in the method for fabricating the Mach-Zehnder modulator according to the present embodiment.
Figure 9A:
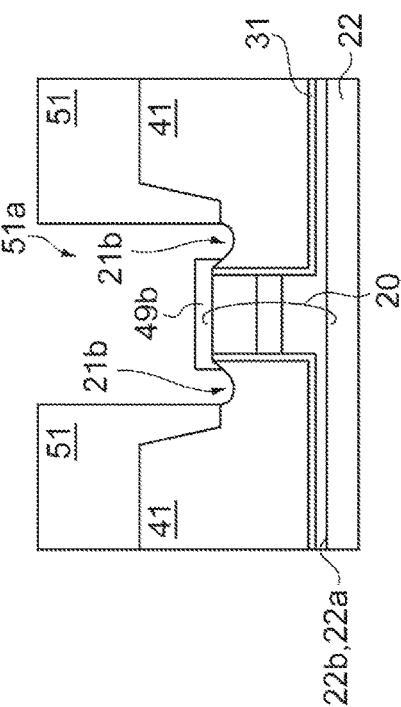

If necessary, an optional process of forming a groove may be added thereto. FIG. 9A is a plan view showing the substrate product SP4 in the optional process. FIG. 9B is a cross sectional view taken along the line IXb-IXb shown in FIG. 9A. FIG. 9C is a cross sectional view taken along line IXc-IXc shown in FIG. 9A. A second mask 51 for the formation of grooves is formed on the substrate product SP4. The second mask 51 has an opening 51*a*, which is located on a groove formed at the edges of the ohmic electrode in the second area 22*c*. Preferably, the width W51 of the opening 51*a* is equal to the distance from the outer edge of one groove in a pair of grooves, which have been already formed along the edges of the ohmic electrode 49 or along the edges of the top face of the semiconductor structure 20, to the outer edge of the other groove. The resin body 41 is etched with the second mask 51 in the second area 22c. The etching with the second mask 51 and the ohmic electrode 49, which works as a mask, allows the groove thus formed to have a large depth and a large width and can provide variations in a cross-sectional shape of the groove. In the method of fabricating the Mach-Zehnder modulator, the etching with the second mask 51 is used for customizing the cross-sectional shape of the groove in the resin body.

Figure 10C:
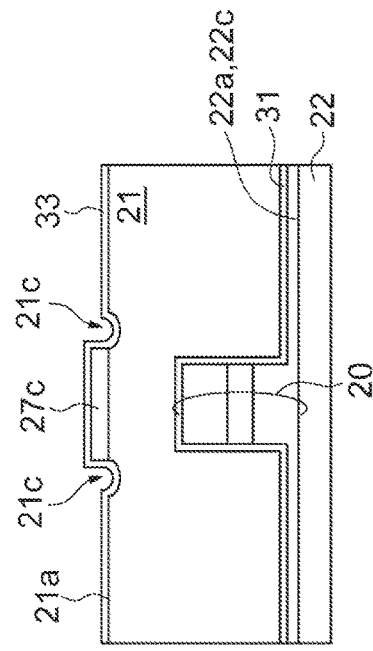
FIGS. 10A, 10B and 10C are schematic views showing a major step in the method for fabricating the Mach-Zehnder modulator according to the present embodiment.
Figure 10B:
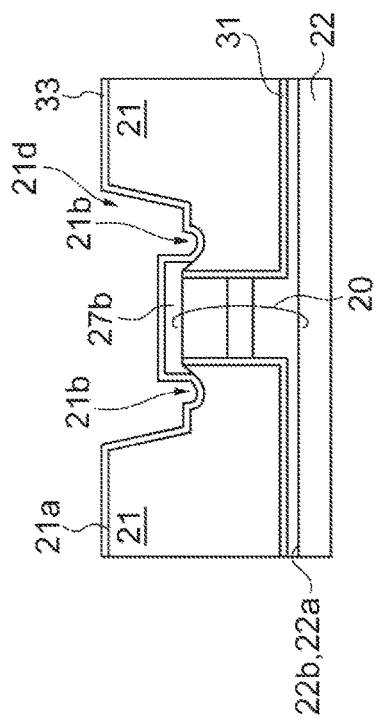
Figure 10A:
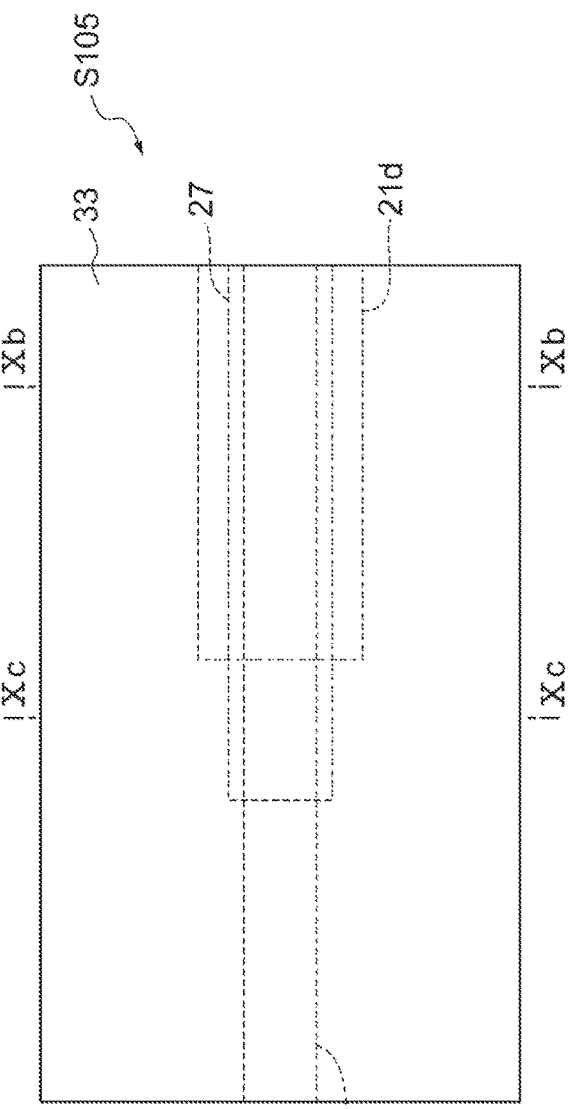

In the present embodiment, the optional process is not applied to the substrate product SP4. The process in step S105 provides the resin body with a structure which the semiconductor device to be fabricated has, and in order to facilitate understanding, the resin body 41 is referred to as the embedding resin body 21 in the following description, and the reference numeral "27" for the ohmic electrode is used instead of the reference numeral "49" in the following explanation of the process. FIG. 10A is a plan view showing a step of forming a protective film. FIG. 10B is a cross sectional view taken along the line Xb-Xb shown in FIG. 10A, and FIG. 10C is a cross sectional view taken along the line Xc-Xc shown in FIG. 10A. In step S105, the second inorganic insulating film 33 is grown on the entire surface of the substrate product SP4 by a CVD method. The second inorganic insulating film 33 may be made of, for example, a silicon oxide film with a thickness of 200 nanometers. The second inorganic insulating film 33 covers the principal surface 21a of the embedding resin body 21, the first grooves 21b and the second groove 21c, and the top and side faces of the ohmic electrode 27.

FIG. 11A is a plan view showing a step of forming an opening in the protective film. FIG. 11B is a cross sectional view taken along the line XIb-XIb shown in FIG. 11A, and FIG. 11C is a cross sectional view taken along the line XIc-XIc shown in FIG. 10A. In step S106, the second inorganic insulating film 33 is processed on the substrate product SP4 to form an opening 33a, which is formed with a mask 53 formed on the second inorganic insulating film 33. The mask 53 has an opening 53a located on the first ohmic electrode portion 27b in the first area 22b, and has no opening in the second area 22c and the third area 22d. The second ohmic electrode portion 27c is covered with the second inorganic insulating film 33. The mask 53 may be made of, for example, resist. An opening 33a is formed in the second inorganic insulating film 33 by etching with the mask 53. An ohmic electrode 27 appears in the opening 33a.

FIG. 12A is a plan view showing a step of forming a conductor. FIG. 12B is a cross sectional view taken along the line XIIb-XIIb shown in FIG. 12A, and FIG. 12C is a cross sectional view taken along the line XIIc-XIIc shown in FIG. 12A. In step S107, a conductor 29 is formed on the substrate product SP4. A plating method can be used to form the electrical conductor 29. In the second area 22c, the width of the second conductive portion 29c of the conductor 29 is larger than that of the second ohmic electrode portion 27c. In the present embodiment, the second conductive portion 29c of the conductor 29 climbs over the edge of the second groove 21c to extend along the surface of a second inorganic insulating film 33, resulting in increase in the mechanical strength of the electrical conductor 29. The end portion of the second conductive portion 29c has a curved upper edge. The curved upper edge allows the electrode to be less likely to peel off than an upper edge with a corner, thereby providing the electrical conductor 29 with an excellent mechanical strength.

Figure 13A:
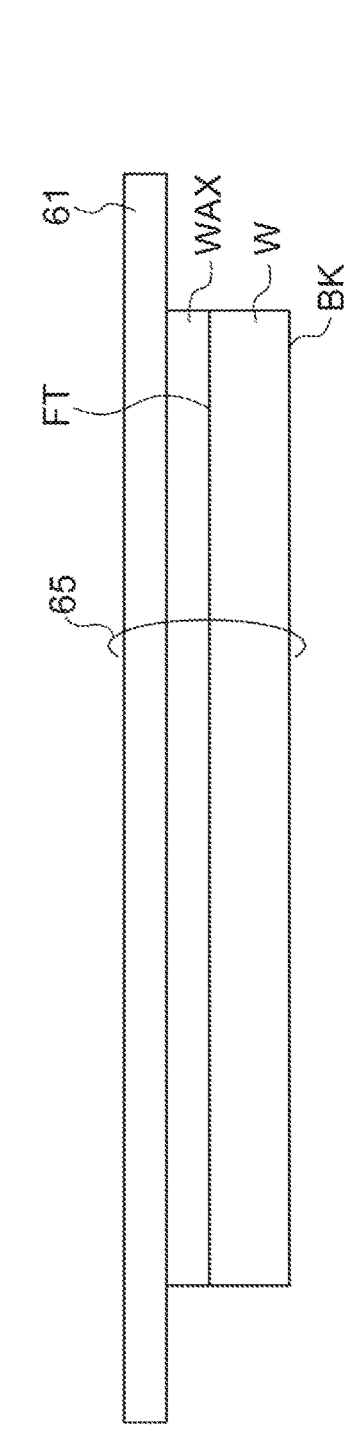
FIGS. 13A and 13B are schematic views showing major steps in the method for fabricating the Mach-Zehnder modulator according to the present embodiment.
Figure 13B:
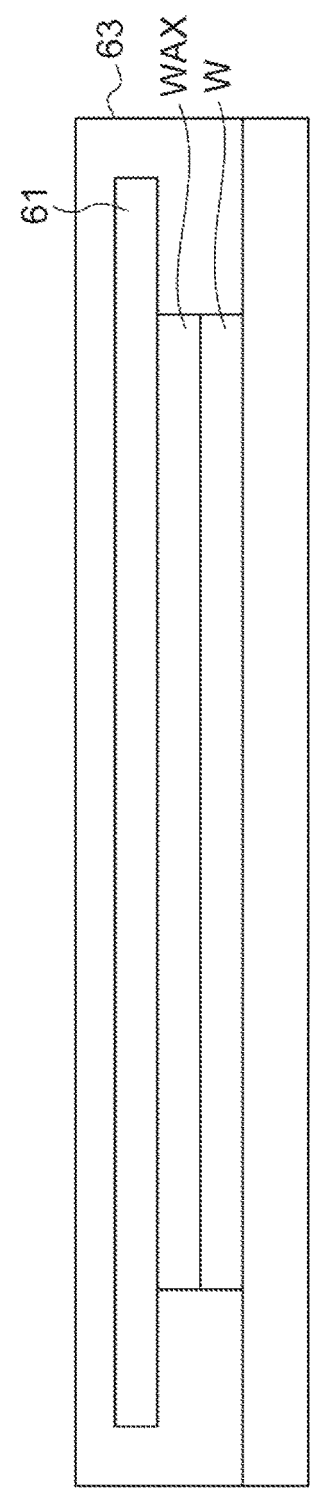
Figure 14:
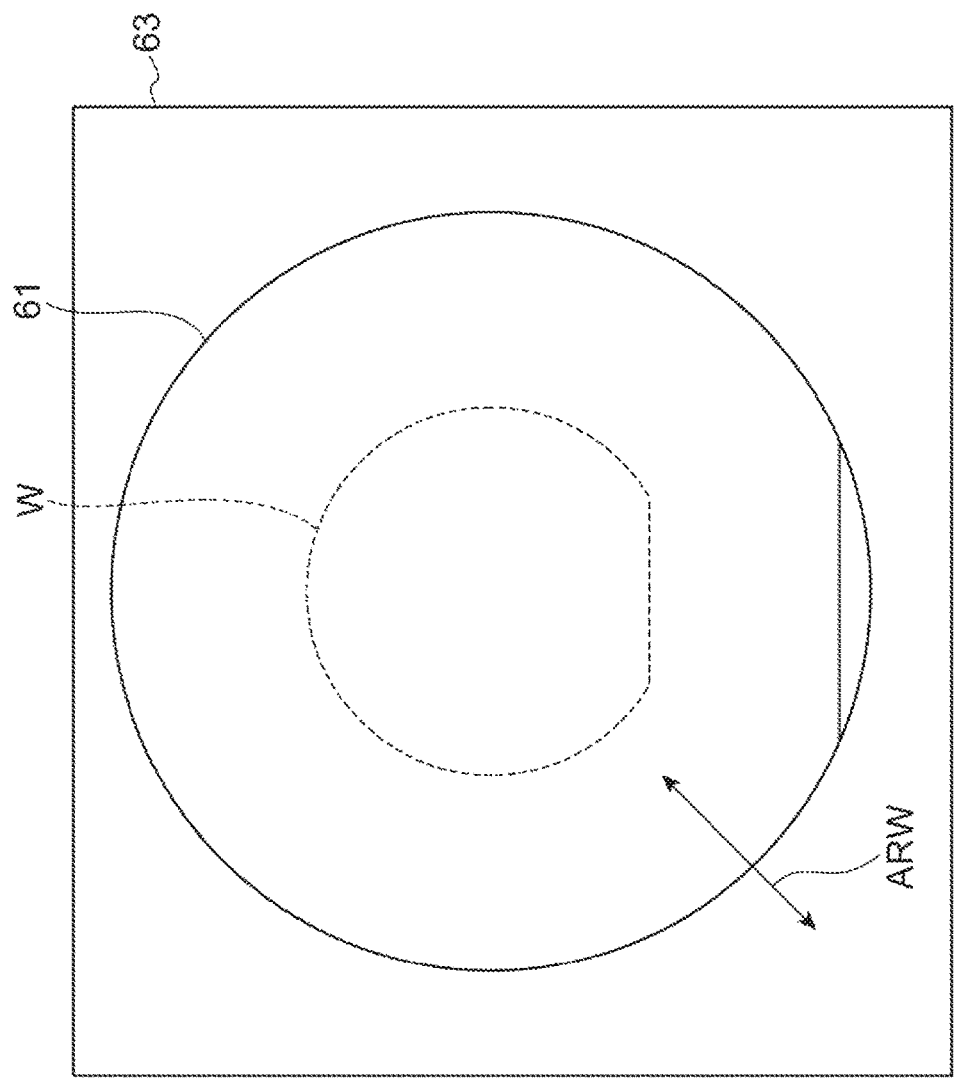
FIG. 14 is a schematic view showing a major step in the method for fabricating the Mach-Zehnder modulator according to the present embodiment.

Carrying out all the above steps completes the wafer process to provide the product W. Thereafter, the back side of the substrate is processed in order to reduce the thickness of the substrate used in the wafer process. Specifically, as shown in FIG. 13A, the front side FT of the product W is fixed to a support member 61, such as a sapphire base, with the wax WAX to prepare an object 65 to be processed, such as a workpiece. The back side BK of the substrate in the product W appears in the appearance of the object 65. This processing is performed by, for example, a chemical mechanical polishing method. As shown in FIG. 13B, the workpiece 65 is attached to the processing apparatus 63. As shown in FIG. 14, the object 65 is moved relative to the processing device 63 in a direction of the arrow ARW to polish the back side of the product W, attached to the support member 61, with a polishing apparatus. The polishing can reduce the thickness of the product W. In the polishing process, the wax WAX applies force to the end portion of the electrode of the product W. The electrode structure according to the present embodiment has a mechanical strength that can provide resistance against the above force. After the completion of the polishing process, peeling off the product W from the wax WAX also applies force to the end portion of the electrode. The electrode structure according to the present embodiment has a mechanical strength enough to provide resistance against the above forces.

The structure of the end portion of the electrode in the second area 22c is not limited to the above embodiment, and may have exemplary shapes as follows.

As shown in FIGS. 15A and 15B, the second groove 21c may have a cross section shape, such as rectangular or square, each of which is along the plane intersecting with the first Ax1. Such a shape can be formed by processing the embedding resin body 21 in an optional process, which performs dry etching with high anisotropy. FIG. 15B is a cross section taken along the line XVb-XVb shown in FIG. 15A.

Figure 16B:
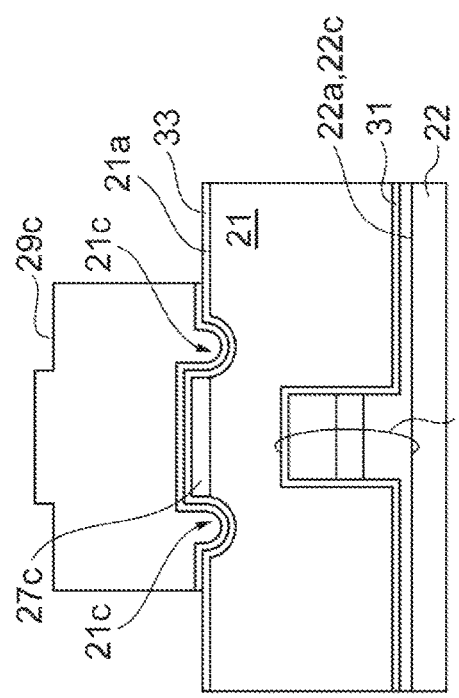
FIGS. 16A and 16B are views each showing a Mach-Zehnder modulator according to the present embodiment.
Figure 16A:
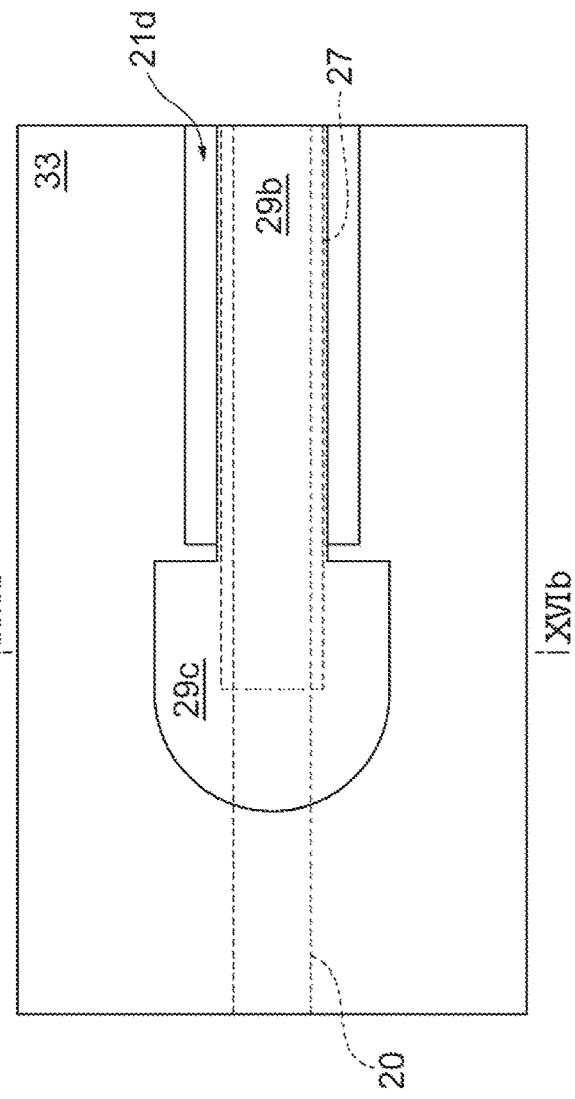

As shown in FIGS. 16A and 16B, the second groove 21c, which is deep in depth and wide in width, can have a concave cross section taken along a plane intersecting with the first axis Ax1. Such a shape is formed in an optional step in which the embedding resin body 21 is processed by less anisotropic dry etching. FIG. 16B is a cross sectional view taken along the line XVIb-XVIb shown in FIG. 16A.

Figure 17A:
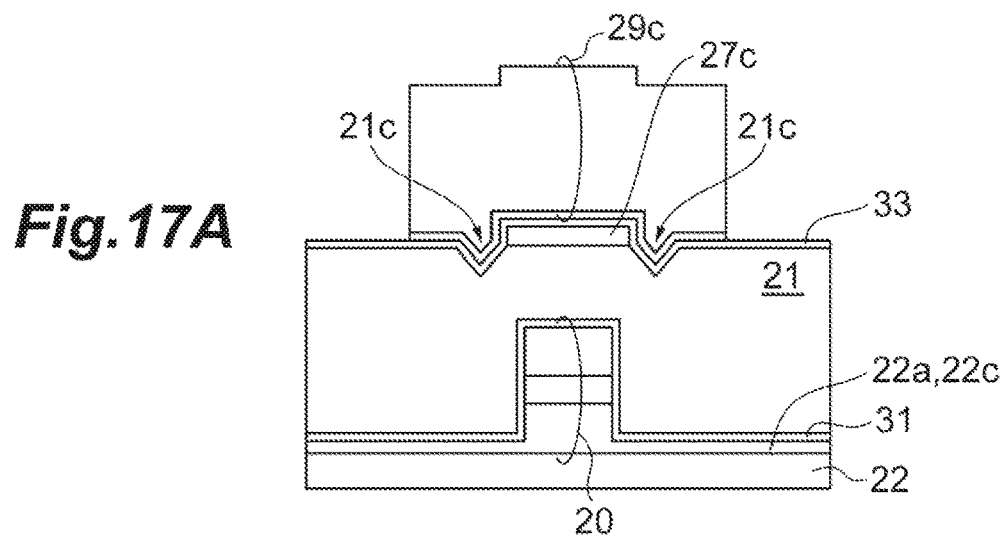
FIGS. 17A, 17B and 17C are views showing structures which can be applied to the Mach-Zehnder modulator according to the present embodiment.

As shown in FIG. 17A, the second groove 21c may have a wedge cross section taken along a plane intersecting with the first axis Ax1.

Figure 17B:
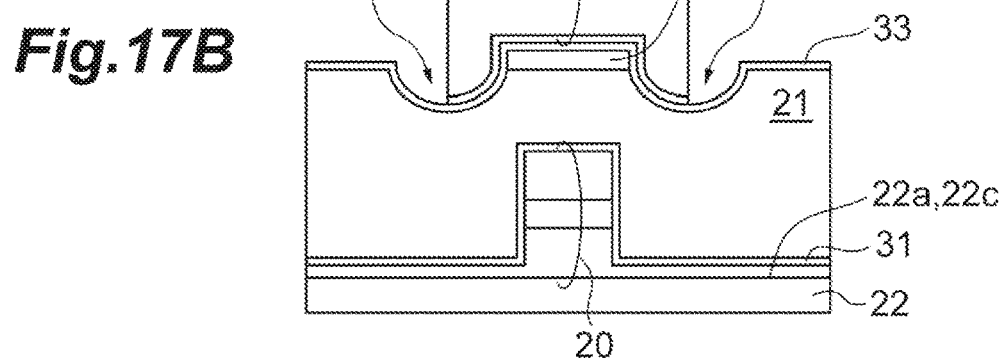

As shown in FIG. 17B, the second groove 21c, which is wide in width, can have a concave cross section along the plane intersecting with the first axis Ax1. Such a shape is formed in an optional step in which the embedding resin body 21 is processed with a mask having a wide opening in width.

Figure 17C:
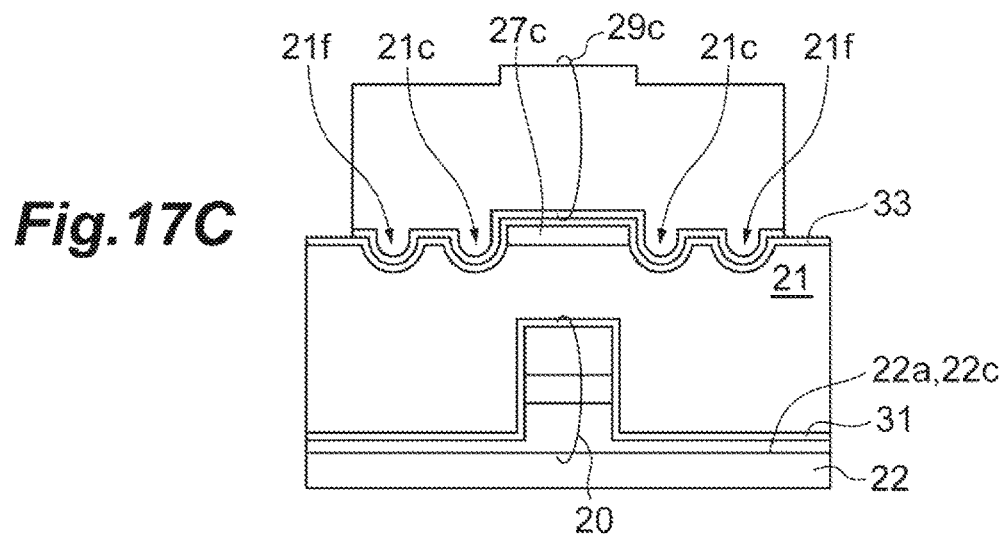

As shown in FIG. 17C, in addition to the second groove 21c, an additional groove (21f) may be provided outside the second groove 21c. Such an arrangement of these grooves can be formed in an optional step in which the embedding resin body 21 is processed with a mask having an additional opening.

Figure 18B:
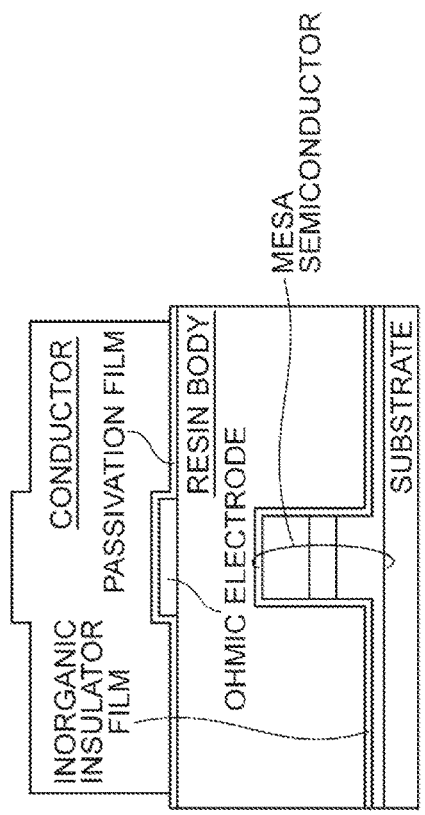
FIGS. 18A and 18B are views each showing a Mach-Zehnder modulator including a wide electrode in the second area.
Figure 18A:
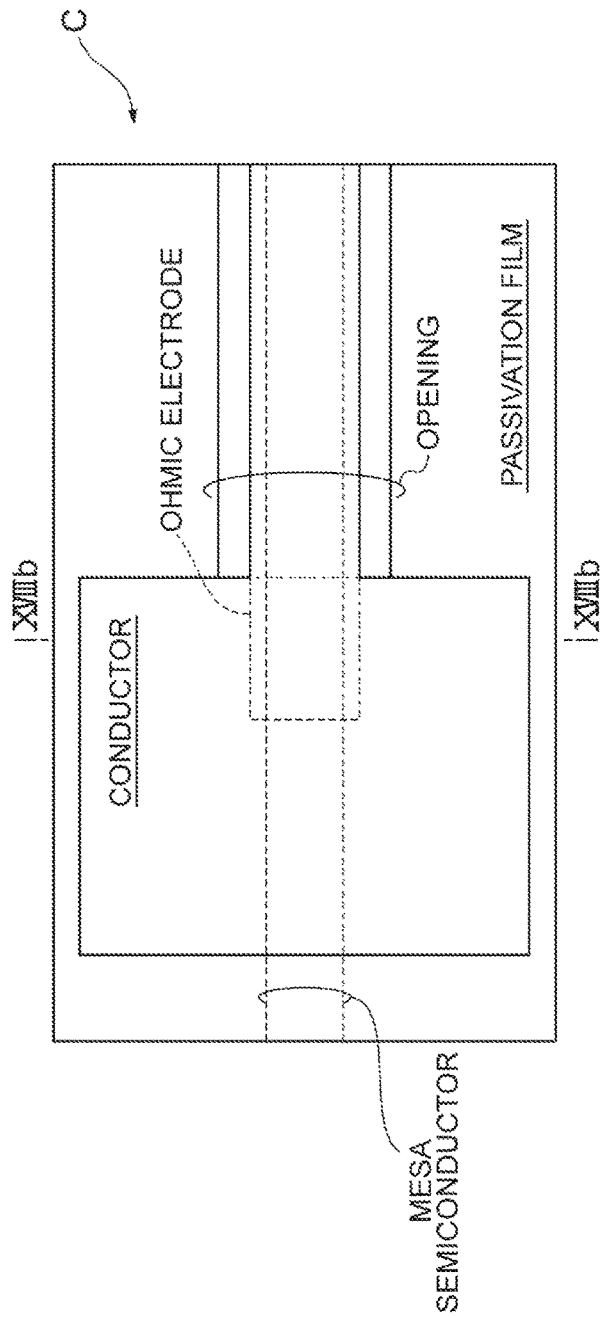

FIGS. 18A and 18B show a Mach-Zehnder modulator C in which a wide electrode is formed on a resin body having no groove in the second area. In the Mach-Zehnder modulator C, the width of the electrode on the resin body in the second area is eight times larger than the width of the electrode on the arm waveguide. The structures according to the present embodiment are superior to the Mach-Zehnder modulator C in terms of the resistance against the application of external forces. The present embodiment offers the high effectiveness of the groove (21c) of the embedding resin body 21.

Having described and illustrated the principle of the invention in a preferred embodiment thereof, it is appreciated by those having skill in the art that the invention can be modified in arrangement and detail without departing from such principles. We therefore claim all modifications and variations coming within the spirit and scope of the following claims.

What is claimed is:

1. A Mach-Zehnder modulator including:
a substrate having a principal surface including a first area, a second area, and a third area, the first area, the second area, and the third area being arranged in a direction of an axis;
a semiconductor structure for an arm waveguide, the semiconductor structure having a first waveguide portion, a second waveguide portion, and a third waveguide portion, the first waveguide portion, the second waveguide portion, and the third waveguide portion being disposed on the first area, the second area, and the third area, respectively;
an embedding resin body having an opening on the first waveguide portion and embedding the semiconductor structure on the principal surface;
an AC electrode; and
a DC electrode,
each of the AC electrode, and the DC electrode having:
an ohmic electrode including a first ohmic electrode portion and a second ohmic electrode portion, the first ohmic electrode portion extending along the first waveguide portion and being connected to the first waveguide portion through the opening of the embedding resin body, and the second ohmic electrode portion being disposed on the embedding resin body in the second area; and
a conductor including a first conductive portion and a second conductive portion, the first conductive portion extending along the first ohmic electrode portion in the first area, and the second conductive portion disposed on the embedding resin body in the second area,
the second conductive portion having a terminal end on the embedding resin body,
the embedding resin body having a groove extending along an edge of the second ohmic electrode portion in the second area, and
the second conductive portion having a width greater than that of the second ohmic electrode portion.

2. The Mach-Zehnder modulator according to claim 1, wherein
the embedding resin body has another groove extending along an edge of the first ohmic electrode portion in the first area, and
the first ohmic electrode portion is disposed in the another groove in the first area.

3. The Mach-Zehnder modulator according to claim 1, wherein the terminal end of the second conductive portion is disposed at a boundary between the second area and the third area, and
wherein the terminal end has a lower edge, and the lower edge has a part extending along a curve on a reference plane extending on a bottom of the second conductive portion and intersecting with an axis normal to the principal surface.

4. The Mach-Zehnder modulator according to claim 1, wherein, in a plane intersecting the axis, the groove has a cross section with a width and a depth.

5. The Mach-Zehnder modulator according to claim 4, wherein the width of the groove is narrower than that of the opening, and the depth of the groove is shallower than that of the opening.

6. The Mach-Zehnder modulator according to claim 1, wherein the conductor extends beyond a boundary of the opening.

7. The Mach-Zehnder modulator according to claim 1, wherein the groove has a rectangular cross-sectional shape.

8. The Mach-Zehnder modulator according to claim 1, wherein the groove has a square cross-sectional shape.

9. The Mach-Zehnder modulator according to claim 1, wherein the groove has a wedge cross-sectional shape.

10. The Mach-Zehnder modulator according to claim 1, wherein the groove has a concave cross-sectional shape.

11. The Mach-Zehnder modulator according to claim 1, wherein the embedding resin body has an additional groove disposed outside the groove in the second area.

12. A Mach-Zehnder modulator including:
a substrate having a principal surface including a first area, a second area, and a third area, the first area, the second area, and the third area being arranged in a direction of an axis;
a semiconductor structure for an arm waveguide, the semiconductor structure having a first waveguide portion, a second waveguide portion, and a third waveguide portion, the first waveguide portion, the second waveguide portion, and the third waveguide portion being disposed on the first area, the second area, and the third area, respectively;
an embedding resin body having an opening on the first waveguide portion and embedding the second waveguide portion and the third waveguide portion on the principal surface, the opening terminating at a first boundary between the first area and the second area;
an ohmic electrode extending beyond the first boundary along the first waveguide portion and the second waveguide portion, the ohmic electrode being connected to the first waveguide portion in the opening of the embedding resin body and being disposed on the embedding resin body and the second waveguide portion outside the opening, the embedding resin body having a groove extending in contact with the ohmic electrode in the opening and outside the opening, the groove extending beyond the first boundary; and
a conductor disposed on the embedding resin body, the groove, and the ohmic electrode outside the opening, the conductor being disposed apart from the groove on the ohmic electrode in the opening and extending beyond the first boundary and terminating at a second boundary between the second area and the third area, and on the embedding resin body and the second area, the conductor having a width greater than that of the ohmic electrode.

* * * * *